(12) United States Patent
Shinohara et al.

(10) Patent No.: US 7,342,706 B2
(45) Date of Patent: Mar. 11, 2008

(54) ELECTROCHROMIC ELEMENT, OPTICAL DENSITY CHANGING ELEMENT, OPTICAL ELEMENT AND PHOTOGRAPHING UNIT

(75) Inventors: Ryuji Shinohara, Kanagawa (JP); Hideki Kaneiwa, Kanagawa (JP); Atsushi Matsunaga, Kanagawa (JP); Kiyoshi Morimoto, Kanagawa (JP)

(73) Assignee: FUJIFILM Corporation, Tolyo (JP)

( * ) Notice: Subject to any disclaimer, the term of this patent is extended or adjusted under 35 U.S.C. 154(b) by 359 days.

(21) Appl. No.: 11/073,862

(22) Filed: Mar. 8, 2005

(65) Prior Publication Data

US 2005/0231784 A1   Oct. 20, 2005

(30) Foreign Application Priority Data

| Mar. 9, 2004 | (JP) | ............................. 2004-065344 |
| May 18, 2004 | (JP) | ............................. 2004-147261 |
| May 19, 2004 | (JP) | ............................. 2004-148744 |

(51) Int. Cl.
*G02F 1/15* (2006.01)

(52) U.S. Cl. ...................................... 359/265; 252/583

(58) Field of Classification Search ................ 359/265, 359/266, 267, 268, 269, 270, 271, 272, 273, 359/274, 275; 252/582, 583, 586, 584, 589
See application file for complete search history.

(56) References Cited

U.S. PATENT DOCUMENTS 6,067,184 A * 5/2000 Bonhote et al. ............ 359/265

6,388,796 B1 * 5/2002 Berneth et al. ............. 359/265

FOREIGN PATENT DOCUMENTS

| JP | 5-142700 A | 6/1993 |
| JP | 6-317815 A | 11/1994 |
| JP | 9-244072 A | 9/1997 |
| JP | 2000-506629 A | 5/2000 |
| JP | 2001-13301 A | 1/2001 |
| JP | 2003-511837 A | 3/2003 |

OTHER PUBLICATIONS

Solid state and Material Sciences, 1990, vol. 16, p. 291-308 C.G. Granqvist, "Chromogenic Materials for Transmittance Control of Large-Area Windows".

Journal of Physical Chemistry B, 2000, vol. 104, p. 11449-11459, D.Cummins et al., "Ultrafast Electrochromic Windows Based on Redox-Chromophore Modified Nanostructured Semiconducting and Conducting Films".

* cited by examiner

*Primary Examiner*—Ricky Mack
*Assistant Examiner*—Tuyen Tra
(74) *Attorney, Agent, or Firm*—Sughrue Mion, PLLC

(57) ABSTRACT

An electrochromic element wherein, in a colored state of the electrochromic element, a first average optical density in a first wavelength range of 450 to 470 nm, a second average optical density in a second wavelength range of 540 to 560 nm and a third average optical density in a third wavelength range of 630 to 650 nm have a fluctuation (difference of a maximum value and a minimum value of the first to third average optical densities) equal to or less than 0.5.

10 Claims, 8 Drawing Sheets

ELECTROCHROMIC ELEMENT, OPTICAL DENSITY CHANGING ELEMENT, OPTICAL ELEMENT AND PHOTOGRAPHING UNIT

BACKGROUND OF THE INVENTION

1. Field of the Invention

The present invention relates to an electrochromic element, an optical element constituted of an electromotive force generating element for generating an electromotive force according to an intensity of an electromagnetic wave, and the aforementioned element, and a photographing unit equipped with such optical element.

The present invention relates to an electrochromic element having an electrochromic material capable of electron exchange on a surface of a nanoporous semiconductor, an optical density changing element having such electrochromic element, an optical element constituted of an aforementioned element and an electromotive force generating element, and a photographing unit equipped with such optical element.

2. Description of the Related Art

An element showing a change in an optical density in response to an electromagnetic wave has a wide field of application. As a material having a function of changing the optical density, namely controlling a light transmission or a light reflection in response to an electromagnetic wave, there are known a photochromic material and an electrochromic material.

The photochromic material is a material capable of changing an optical density thereof in response to a light irradiation, and is applied to sunglasses, an ultraviolet checker, printing-related materials, processed fiber products and the like.

The electrochromic material is a material capable of changing an optical density thereof in response to an electron injection or an electron ejection, and is applied to an antiglare mirror for automotives, an automotive window material and the like.

The application of such optical density changing material includes a photographing system, including a camera. For example, a film with lens is recently popular, because of its simplicity in operation, as a camera unit not requiring a film loading operation and enabling a photographing operation immediately after purchase. However the prior film with lens is not provided with a mechanism for regulating an exposure amount, as it is designed for simplicity. Therefore, a film with lens, loaded with a high sensitivity film, results in an excessive exposure in a photographing operation in a bright environment, thus often generating a failed whitish picture. Therefore, a film with lens capable of automatic switching of a diaphragm according to the light amount at the photographing, utilizing an AE control by a light metering in the photographing operation, has been commercialized. This has significantly reduced the photographing failure caused by the excessive exposure amount.

For realizing a "light regulating filter" for regulating the incident light amount to a photosensitive material, according to the light amount at the photographing operation, in a simple and inexpensive manner, there is proposed a film with lens utilizing the aforementioned photochromic material (for example JP-A No. 5-142700, JP-A No. 6-317815 and JP-A No. 2001-13301). More specifically, a photochromic material means a material having a property for developing a color or increasing an optical density when subjected to a light irradiation of a certain wavelength, and extinguishing the color or decreasing the optical density when the light irradiation is terminated or when subjected to heating or a light irradiation of a different wavelength, and such property is known in inorganic compounds containing silver halide and in a part of organic compounds. A light regulation is considered possible by positioning a filter, formed by a photochromic material, on an optical axis and executing color development and color erasing according to the incident light amount.

However, the photochromic compound generally requires about 1 minute for the color development and about several tens of minutes for color erasing (cf. Solid State and Material Science, 1990, Vol. 16, p. 291), and is therefore difficult to employ as a light regulating system for a photographing light.

On the other hand, the aforementioned electrochromic material is known to be capable of faster color development and color erasing. More specifically, the electrochromic material means a material having a property of increasing an optical density by an electron injection or an electron ejection under a voltage application, and decreasing the optical density by an electron transfer opposite to that at the increase of the optical density, and such property is known in certain metal oxides and organic compounds. A "light regulating filter" capable of regulating the incident light amount to the photosensitive material according to the light amount at the photographing operation can be realized by combining such electrochromic material with a power source and a light sensor for detecting the photographing light amount.

A light regulating system, laminating a solar cell generating an electromotive force in response to a light with an electrochromic material, is proposed (for example JP-A No. 9-244072). An automatic light regulation according to the light can be expected also in this system. However, in such proposed structure where the solar cell and the electrochromic material are superposed, a part of the light passing through the electrochromic material is inevitably absorbed by the solar cell, and such structure is therefore unsuitable for a system of a camera-related optical element in which it is desired to utilize the incident light amount to the photorecording medium as maximum as possible in a scene not requiring such light regulation.

On the other hand, an increase in the response speed is reported in an electrochromic material adsorbed in a porous layer of titanium oxide or antimony-doped tin oxide (for example JP-T No. 2000-506629, Solar Energy Materials and Solar Cells, 1998, Vol. 55, p. 215 and Journal of Physical Chemistry B, 2000, Vol. 104, p. 11449).

In case of utilizing an electrochromic element (optical density changing element) as a light regulating filter, a hue of the electrochromic element in a colored state is important. For example, in case of mounting a light regulating filter on a film with lens and regulating the light amount entering the film with lens, there is preferred an electrochromic element having a color hue close to a spectral sensitivity of a photographing film (for example a color negative film) loaded in the film with lens. In case the hue of the electrochromic element in the colored state is significantly different from the spectral sensitivity of the photographing film (for example a color negative film), a photograph obtained by an ordinary photographing processing shows a perturbed color balance, thus becoming a failure. In the prior technology, there has not been known an electrochromic element capable of showing a spectral sensitivity close to the spectral sensitivity of the photographing film.

It is reported that two types of such electrochromic material, adsorbed on a nanoporous semiconductor (such as titanium oxide or antimony-doped tin oxide) layer to constitute a set of electrodes (anode and cathode) and used in a mutually opposed relationship across an electrolyte, function as an optical density changing element of a high response speed (cf. JP-T No. 2000-506629, JP-T No. 2003-511837 and Journal of Physical Chemistry B, 2000, Vol. 104, p. 11449.).

It is investigated to utilize an optical density changing element in combination with a photosensor as a light regulating filter for photographing purpose. A use of a camera in an excessively bright location results in a failed photographing, but such failure can be prevented by an "automatic light regulating filter" in which a sensor, detecting a brightness at the photographing operation, sends an electric power to the optical density changing element to develop a color therein. For realizing such light regulating filter for photographing purpose, it is necessary to suitably utilize electrochromic materials showing color development at arbitrary wavelengths and having a fast response according to the purpose of photographing.

SUMMARY OF THE INVENTION

In case of utilizing an electrochromic element (optical density changing element) as a light regulating filter, a hue of the electrochromic element in a colored state is important. For example, in case of mounting a light regulating filter on a film with lens and regulating the light amount entering the film with lens, there is preferred an electrochromic element having a color hue close to a spectral sensitivity of a color negative film loaded in the film with lens. In case the hue of the electrochromic element in the colored state is significantly different from the spectral sensitivity of the color negative film, a photograph obtained by an ordinary photographing processing shows a perturbed color balance, thus becoming a failure. The first object of the present invention is to solve such problem.

Naturally the application is not limited to a photographing equipment such as a film with lens, but covers any and all uses requiring a light regulating function or a light decreasing function.

The aforementioned first object has been attained by observing specified wavelengths (3 regions) when the electrochromic element assumes a colored state and maintaining differences of the average optical densities in such wavelengths at a predetermined level or less. A representative electrochromic material to be employed in the electrochromic element can be an inorganic electrochromic material or an organic electrochromic material. As an optical density changing material for the electrochromic element, the present invention employs a semiconductor nanoparticle film in which an organic electrochromic material is adsorbed, thereby enabling a preferred hue control and a quick response. Preferably, the aforementioned first object can be attained by the following first invention:

(1) An electrochromic element wherein, in a colored state of the electrochromic element, a first average optical density in a first wavelength range of 450 to 470 nm, a second average optical density in a second wavelength range of 540 to 560 nm and a third average optical density in a third wavelength range of 630 to 650 nm have a fluctuation (difference of a maximum value and a minimum value of the first to third average optical densities) equal to or less than 0.5.

(2) An electrochromic element according to (1), wherein the first average optical density, the second average density and the third average optical density have a fluctuation (difference of a maximum value and a minimum value of the first to third average optical densities) equal to or less than 0.3.

(3) An electrochromic element according to (1) or (2), wherein each of the first average optical density, the second average density and the third average optical density is 0.5 or higher.

(4) An electrochromic element according to any of (1) to (3), comprising a cathode, an anode and an electrolyte.

(5) An electrochromic element according to (4), on at least one of the cathode and the anode, at least two materials capable of an electron exchange and showing a change in an absorption spectrum in a spectral range of 400 to 700 nm as a result of an electron exchange.

(6) An electrochromic element according to (4) or (5), at least two materials capable of an electron exchange and showing a change in an absorption spectrum in a spectral range of 400 to 700 nm as a result of an electron exchange, on the cathode; and at least a material capable of an electron exchange and not showing a change in an absorption spectrum in a spectral range of 400 to 700 nm as a result of an electron exchange, on the anode.

(7) An electrochromic element described in (4), comprising, on one of the cathode and the anode, a material capable of an electron exchange and changing an absorption spectrum within a wavelength range of 400 to 700 nm as a result of the electron exchange.

(8) An electrochromic element described in (4) or (7), comprising, on the cathode, a material capable of an electron exchange and changing an absorption spectrum within a wavelength range of 400 to 700 nm as a result of the electron exchange.

(9) An electrochromic element described in (4), (7) or (8), comprising: a material capable of an electron exchange and changing an absorption spectrum within a wavelength range of 400 to 700 nm as a result of the electron exchange, on the cathode; and a material capable of an electron exchange and not changing an absorption spectrum within a wavelength range of 400 to 700 nm as a result of the electron exchange, on the anode.

(10) An electrochromic element described in any of (1) to (9), comprising at least one of compounds selected from formulas (1), (2) and (3):

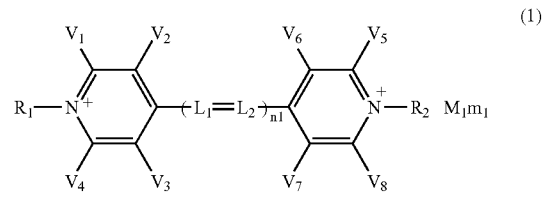

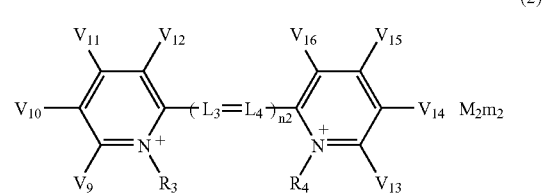

-continued

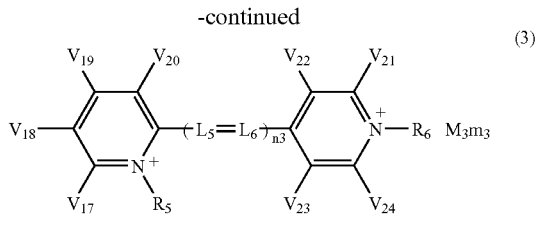

wherein, in the general formulas (1), (2) and (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent;

$R_1$, $R_2$, $R_3$, $R_4$, $R_5$ and $R_6$ each independently represents a hydrogen atom, an alkyl group, an aryl group or a heterocyclic group;

$L_1$, $L_2$, $L_3$, $L_4$, $L_5$ and $L_6$ each independently represents a methine group or a nitrogen atom;

$n_1$, $n_2$ and $n_3$ each independently represents 0, 1 or 2;

$M_1$, $M_2$ and $M_3$ each independently represents a charge balancing counter ion, and $m_1$, $m_2$ and $m_3$ each independently represents a number equal to or larger than 0 necessary for neutralizing a charge of a molecule.

The compound represented by the general formula (1), (2) or (3) is preferably adsorbed on the cathode of the electrochromic element.

(11) An electrochromic element according to any of (1) to (10), which has, in a decolored state of the electrochromic element, an optical density of 0.2 or less at a wavelength of 400 nm.

(12) An electrochromic element according to any of (1) to (11), wherein, in a decolored state of the electrochromic element, each of a fourth average optical density in a fourth wavelength range of 400 to 500 nm, a fifth average optical density in a fifth wavelength range of 500 to 600 nm and a sixth average optical density in a sixth wavelength range of 600 to 700 nm is 0.1 or less.

(13) An optical element comprising: an electromotive force generating element capable of generating an electromotive force in response to an electromagnetic wave; and an electrochromic element according to any of (1) to (12), driven by the electromotive force.

(14) A photographing unit comprising an optical element according to (13).

(15) A photographing unit according to (14), wherein the photographic unit is a film with lens.

The second object of the present invention is to provide an electrochromic element and an optical density changing element having a fast response to light of various wavelengths. The present invention also provides an optical element constituted of the optical density changing element and an electromotive force generating element, and a photographing unit provided with such optical element.

The aforementioned second object of the invention have been attained by following second invention:

(16) An electrochromic element comprising: a semiconductor material which is a nanoporous semiconductor material having a roughness factor of 20 or higher; and an electrochromic material on a surface of the semiconductor material, the electrochromic material comprising at least one of electrochromic materials represented by formulas (1), (2) and (3):

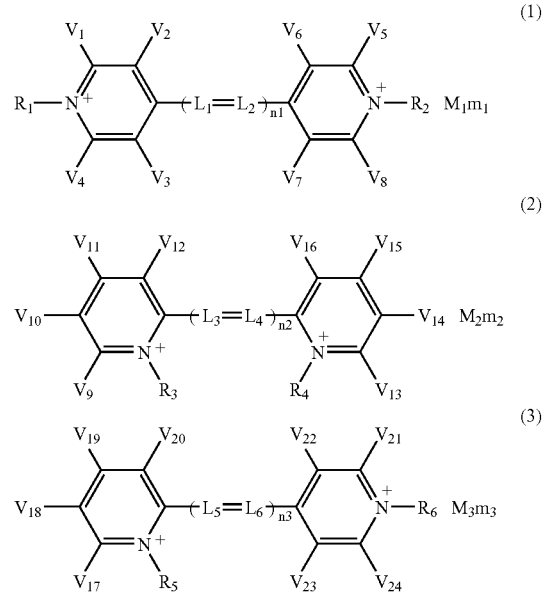

wherein $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent; $R_1$, $R_2$, $R_3$, $R_4$, $R_5$ and $R_6$ each independently represents a hydrogen atom, an alkyl group, an aryl group or a heterocyclic group; $L_1$, $L_2$, $L_3$, $L_4$, $L_5$ and $L_6$ each independently represents a methine group or a nitrogen atom; $n_1$, $n_2$ and $n_3$ each independently represents 0, 1, 2 or 3; $M_1$, $M_2$ and $M_3$ each independently represents a charge balancing counter ion, and $m_1$, $m_2$ and $m_3$ each independently represents a number equal to or larger than 0 necessary for neutralizing a charge of a molecule; and in the case $n_1$, $n_2$ and $n_3$ are 0, $R_1$, $R_2$, $R_3$, $R_4$, $R_5$ and $R_6$ each independently represents an aryl group, and compounds represented by the formulas (1) to (3) each independently has at least a group selected from a sulfo group, a phosphono group and a phosphato group.

(17) An electrochromic element described in (16), wherein, in the formulas (1) to (3), $n_1$, $n_2$ and $n_3$ each independently represents 1; $L_1$, $L_2$, $L_3$, $L_4$, $L_5$ and $L_6$ each independently represents a methine group; and compounds represented by the general formulas (1) to (3) each independently has at least two phosphono groups or two phosphato groups.

(18) An electrochromic element described in (16), wherein, in the formula (1), $n_1$ is 0; the compound represented by the formula (1) has at least two phosphono groups or two phosphato groups.

(19) An electrochromic element described in any of (16) to (18), which has, in a decolored state of the electrochromic element, an optical density equal to or less than 0.125 at any wavelength within a wavelength range of 400 to 700 nm.

(20) An optical density changing element comprising at least one electrochromic element described in any of (16) to (19):

(21) An optical density changing element described in (20), which has, in a decolored state of the optical density changing element, an optical density of 0.2 or less at a wavelength of 400 nm.

(22) An optical density changing element described in (20) or (21), wherein, in a decolored state of the optical density changing element, each of a fourth average optical density in a fourth wavelength range of 400 to 500 nm, a fifth average optical density in a fifth wavelength range of 500 to 600 nm and a sixth average optical density in a sixth wavelength range of 600 to 700 nm is 0.1 or less.

(23) An optical element comprising: an electromotive force generating element capable of generating an electromotive force in response to an electromagnetic wave; and an optical density changing element described in (20) or (21), capable of changing an optical density of the optical density changing element by the electromotive force.

(24) A photographing unit comprising an optical element described in (23):

(25) A photographing unit described in (24), wherein the photographic unit is a film with lens.

DETAILED DESCRIPTION OF THE INVENTION

Figure 1:
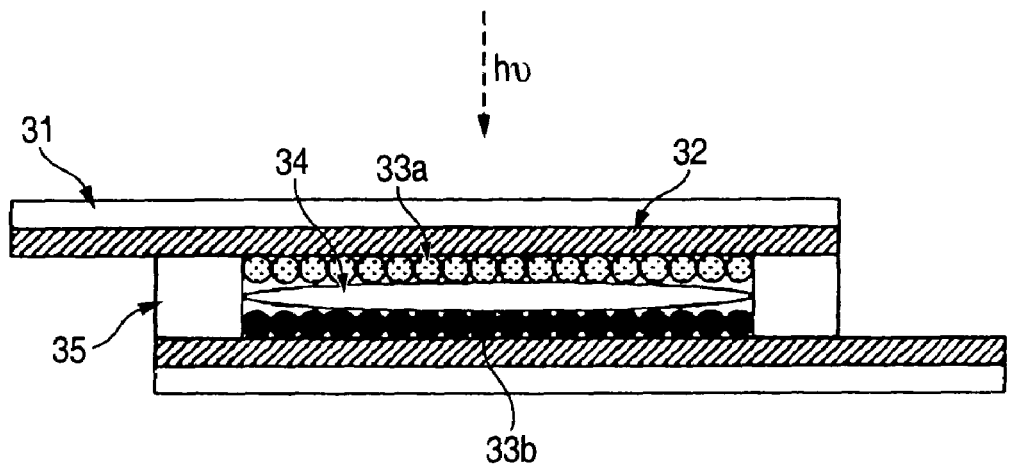
FIG. 1 is a schematic cross-sectional view showing a representative example of configuration of an optical density changing element of the present invention.

In the following, the present invention will be explained in detail.

In the invention, an "optical density" means a value A calculated by a following equation (1) for an incident light intensity $I_0$ to the optical density changing element and a transmitted light intensity $I_T$:

$$A = -\log(I_T/I_0). \quad \text{equation (1):}$$

In the invention, "nanoporous material" or "nanoporous semiconductor material" means a material or semiconductor material in which a surface area is increased by forming irregularities of a nanometer order in order to adsorb a larger amount of material on the surface. A level of porosity is represented by a "roughness factor".

In the invention, a "roughness factor of a nanoporous semiconductor material" is a proportion of an actually effective surface area with respect to a projected plane area of a surface of a semiconductor material layer. More specifically, it can be measured by a BET method.

In the invention, a "decolored state" means a state where an optical density changing element is maintained at an optical density as low as possible, for example by shortcircuiting the poles of the optical density changing element, or by applying an inverse voltage between the poles, namely applying a voltage in a direction inverse to a voltage applied at the color development.

In the invention, a "semiconductor material" follows an ordinary definition. For example, according to Dictionary of Physics (published by Baifu-kan), the "semiconductor material" means a substance having an electrical resistance between a metal and an insulating ssubstance.

In the invention, "adsorption of an electrochromic material to a manoporous semiconductor material" means a phenomenon in which an electrochromic material is adsorbed by a chemical coupling or a physical coupling to the surface of a nanoporous semiconductor material, and the definition of adsorption follows an ordinary definition. The adsorption of an electrochromic material to a nanoporous semiconductor material can be detected for example by a following method.

A nanoporous semiconductor material on which an electrochromic material is assumed to be adsorbed is immersed in a 0.1M NaOH solution and shaken for 3 hours at 40° C. A used amount of the solution is determined by a coating amount of the nanoporous semiconductor material, and is suitably 0.5 ml for a coating amount of 1 g/m$^2$. The solution after the shaking is subjected to a measurement with a spectrophotometer. As a result, there is detected an absorption band of the employed electrochromic material, and, in case the absorbance of the absorption peak is 0.01 or higher, the electrochromic material is considered to have been "adsorbed" in the nanoporous semiconductor material. A type and a concentration of the employed immersing solution (NaOH in the foregoing explanation), and a temperature and a time of shaking are determined according to the types of the nanoporous semiconductor material and the electrochromic material, and are not limited to the foregoing description.

In the invention, "electromagnetic wave" follows an ordinary definition. For example, according to Dictionary of Physics (published by Baifu-kan), an electric field and a magnetic field include a field static in time and a wave field changing in time and propagating to a distant location in space, and such wave field is defined as an electromagnetic wave. More specifically, it is classified into a γ-ray, an X-ray, an ultraviolet light, a visible light, an infrared light, and an electric wave. The electromagnetic wave considered in the invention includes all these, but, in case of applying the optical element of the invention to a light regulating system of a camera unit, it preferably relates to an ultraviolet light, a visible light and an infrared light, more preferably an ultraviolet light and a visible light.

An electrochromic element (the first invention) adapted for use as a light regulating filter and capable of providing a spectral sensitivity close to that of a photographing film is an electrochromic element in which, in a colored state thereof, an average optical density in a wavelength range of 450-470 nm, an average optical density in a wavelength range of 540-560 nm and an average optical density in a wavelength range of 630-650 nm have a fluctuation (difference of a maximum value and a minimum value of the three average values) equal to or less than 0.5 (preferably equal to or less than 0.3) in the optical density, and more preferably an electrochromic element in which, in a colored state thereof, each of an average optical density in a wavelength range of 450-470 nm, an average optical density in a wavelength range of 540-560 nm and an average optical density in a wavelength range of 630-650 nm is 0.5 or higher (preferably 0.8 or higher and more preferably 0.95 or higher). A schematic cross-sectional view of a representative example of the optical density changing element (electrochromic element) of the invention is shown in FIG. 1.

In the invention, in a colored state of the electrochromic element, a fluctuation equal to or less than 0.5 among (a) an average optical density in a wavelength range of 450-470 nm, (b) an average optical density in a wavelength range of 540-560 nm and (c) an average optical density in a wavelength range of 630-650 nm means that a difference of a maximum value and a minimum value of the three optical densities in (a), (b) and (c). Such fluctuation is preferably 0.3 or less, more preferably 0.2 or less in the optical density, further preferably 0.15 or less and most preferably 0.1 or less.

A hue of the electrochromic element in the colored state preferably shows an overlapping in the spectral sensitivity as large as possible, with the hue of a photorecording medium included in a photographing unit.

The electrochromic element of the invention, when employed as a light regulating element for example in a photographing unit (preferably a camera unit), preferably has absorption characteristics close to neutral gray corresponding to uniform light absorption, and optical density changing element is preferably capable of absorbing visible light, preferably visible light of plural different wavelengths, more preferably blue, green and red light and further preferably with average optical densities as described in the foregoing solving means (2).

The "neutral gray" in the invention includes not only a case where the absorption spectrum of the electrochromic element in a colored state is uniform over an entire wavelength range of 400 to 700 nm (uniform means that an average optical density in 400-700 nm and an optical density at each wavelength show small difference, for example 0.1) but also a case where the hue of the element in the colored state shows a large overlapping with that of the recording medium in the photographing unit, thereby realizing a substantially "neutral gray" state for the photographing unit.

An optical element of the invention includes an electromotive force generating element for generating an electromotive force by an electromagnetic wave, and an optical density changing element (electrochromic element) showing a change in the optical density by such electromotive force, and can serve as a light regulating element in which a light transmission thereof is changed according to an intensity of an electromagnetic wave, since the optical density of the optical density changing element is changed according to an electromotive force generated from the electromotive force generating element, namely according to the intensity of the electromagnetic wave.

A change rate of the optical density as a function of the electromotive force generated from the electromotive force generating element can be regulated according to the purpose. For example, in the case of regulating the light amount entering a film with lens, it is preferable to generate the electromotive force in such a manner that the change rate of the light amount becomes as close as possible to the change rate of the optical density.

In the following each element in the optical element of the invention will be explained.

In the invention, an "element generating an electromotive force (electromotive force generating element)" is an element for converting an electromagnetic energy into an electric energy. A specific example is a solar cell which converts solar light into an electric energy. The solar cell may be formed by various compounds such as single crystalline silicon, polycrystalline silicon, amorphous silicon, cadmium telluride or indium copper selenide, and a known solar cell utilizing such compounds may be suitably selected, in the optical element of the invention, according to the purpose.

Also a photoelectric converting element utilizing an oxide semiconductor sensitized with a dye (hereinafter represented as dye-sensitized photoelectric converting element) and a photoelectric chemical cell utilizing such element, as described in Nature (vol. 353, p. 737-740, 1991), U.S. Pat. No. 4,927,721 and JP-A No. 2002-75443, can be utilized as the electromotive force generating element in the invention. Such dye-sensitized photoelectric converting element is also preferable as the electromotive force generating element in the invention.

Also an electromagnetic wave sensor and a voltage source may be combined to form an the electromotive force generating element. The electromagnetic wave sensor in such case is not particularly restricted, and can be, for example, a phototransistor, a CdS sensor, a photodiode, a CCD, a CMOS, an NMOS or a solar cell. A material constituting the electromagnetic wave sensor can be suitably selected according to a wavelength of the electromagnetic wave to be responded. The electromagnetic wave sensor preferably has a high directionality to the electromagnetic wave. The electromagnetic sensor may be same as an image pickup element. For example, in case of a digital still camera, a CCD, a CMOS device or an NMOS device employed as an image pickup element may also be utilized, at the same time, as an electromagnetic wave sensor. The voltage source is not particularly restricted and can be a dry battery, a lead battery, a diesel power generator or a wind power generator. The dry battery can be a primary battery such as an alkali dry battery or a manganese dry battery, or a secondary battery such as a nickel-cadmium battery, a nickel-hydrogen battery, or a lithium ion battery.

A preferred electromotive force generating element in the invention is a solar cell constituted of single crystalline silicon, polycrystalline silicon, or amorphous silicon, a dye-sensitized photoelectric converting element, or a combination of a phototransistor and a dry battery. In case of applying the optical element of the invention to a photographing unit (preferably camera unit), the electromotive force generating element preferably generates an electromotive force of a magnitude corresponding to the intensity of an irradiating electromagnetic wave (particularly solar light).

In the invention, "element which changes in optical density (optical density changing element)" means an element which changes an optical density by an electromotive force generated by the electromotive force generating element, namely by an electrical energy, thereby changing a transmittance of the electromagnetic wave.

The optical density changing element has a semiconductor material in which a material showing a change in the optical density in response to an electrical energy (electrochromic material) is adsorbed, and is provided further with a substrate bearing a conductive coating, an electrolyte realizing an electrical conductivity in the optical density changing element and the like. FIG. 1 shows a representative structure of the optical density changing element. Referring to FIG. 1, an electrochromic material is adsorbed (33a, 33b) in a semiconductor material which is made porous. The electrochromic materials change the optical density respectively in response to electric energies supplied from upper and lower conductive coatings 32. In response to such change of the electrochromic material in the optical density, an incident electromagnetic wave hv is absorbed by the electrochromic material whereby the transmittance is changed. The optical density changing element is not limited to the form illustrated in FIG. 1 but can assume various forms according to the application, for example, an optical filter, a lens, a diaphragm, a mirror, a window pane, eyeglasses or a display panel. For a photographing unit (preferably camera unit), an optical filter, a diaphragm or a lens is preferable.

A substrate for the optical density changing element is not particularly restricted, and can be, for example, glass, plastics, polyethylene terephthalate (PET), polyethylene naphthalate (PEN), triacetyl cellulose (TAC), polycarbonate (PC), polysulfone, poethersulfone (PES), polyether ether ketone, polyphenylene sulfide, polyarylate (PAR), polyamide, polyimide (PIM), polystyrene, a norbornene resin (Arton), an acrylic resin, or polymethyl methacrylate (PMMA), which can be suitably selected according to the application and the form. There is preferably selected a material showing little absorption to the electromagnetic wave of the object of the optical element of the invention, and, glass, PET, PEN, TAC or acrylic resin is particularly preferable for the light of $\lambda=400\text{-}700$ nm. Also for avoiding a loss of the transmitted light by a reflection on the substrate surface, an antireflective layer (for example a thin silicon oxide layer) is preferably provided thereon. Also various functional layers may be provided on the surface, such as an impact absorbing layer for preventing the element from an impact, an antifriction layer for preventing the element from scratch, and an electromagnetic wave absorbing layer for cutting off an unintended electromagnetic wave (for example ultraviolet light in an optical element for visible light). There are known an ultraviolet absorber and a filter layer formed by providing the same on a transparent substrate (for example compounds (I-1)-(VIII-3) described in JP-A No. 2001-147319 may be employed as the ultraviolet absorber).

An electroconductive layer constituting the optical density changing element is not particularly restricted, and can be formed, for example, of a metal film (gold, silver, chromium, palladium, tungsten or an alloy thereof), an oxide semiconductor film (tin oxide, silver oxide, zinc oxide, vanadium oxide, ITO (indium oxide doped with tin oxide), antimony-doped tin oxide (ATO), FTO (fluorine-doped tin oxide), AZO (aluminum-doped zinc oxide), a conductive nitride film (titanium nitride, zirconium nitride, or hafnium nitride), a conductive boronide film ($LaB_6$), a spinel compound ($MgInO_4$, $CaGaO_4$), a conductive polymer film (polypyrrole/$FeCl_3$), an ionic conductive film (polyethylene oxide/$LiClO_4$), or an inorganic/organic composite film (indium oxide powder/saturated polyester resin). It is preferable to select a material of low absorption to the electromagnetic wave of the object of the optical element of the invention, and tin oxide, FTO or ITO is particularly preferable for the light of $\lambda=400\text{-}700$ nm. Also in order to reduce the absorption of the electromagnetic wave of the object, the conductive layer is preferably as thin as possible within an extent that the electrical conductivity can be secured. More specifically, the conductive layer preferably has a thickness of 1000 nm or less, more preferably 200 nm or less and particularly preferably 100 nm or less.

A semiconductor material constituting the optical density changing element is not particularly restricted to following examples, but can be formed by a metal oxide, a metal sulfide or a metal nitride.

A metal oxide can be, though not restrictive, titanium oxide, zinc oxide, silicon oxide, lead oxide, tungsten oxide, tin oxide, indium oxide, niobium oxide, cadmium oxide, bismuth oxide, aluminum oxide, ferrous oxide or a composite compound thereof, or such compound doped with fluorine, chlorine, antimony, phosphor, arsine, boron, aluminum, indium, gallium, silicon, germanium, titanium, zirconium, hafnium or tin. There can also be employed titanium oxide surfacially coated with ITO, antimony-doped tin oxide or FTO.

A metal sulfide can be, though not restrictive, zinc sulfide, cadmium sulfide or a composite compound thereof, or such compound doped with aluminum, gallium, or indium. There can also be employed another material surfacially coated with a metal sulfide.

A metal nitride can be, though not restrictive, aluminum nitride, gallium nitride, indium nitride or a composite compound thereof, or such compound doped with a small amount of different atoms (tin, germanium etc.). There can also be employed another material surfacially coated with a metal nitride. It is preferable to select a material of low absorption for the electromagnetic wave of the object of the optical element of the invention, and, for the light of $\lambda=400\text{-}700$ nm, titanium oxide, tin oxide, zinc oxide, zinc sulfide or gallium nitride is preferable, and tin oxide or zinc oxide is particularly preferable.

In the first invention, an adsorption of the electrochromic material on such semiconductor material realizes smooth injection and ejection of electrons in the electrochromic element, thereby achieving a change in the optical density of the optical density changing element within a short time. A larger adsorption amount of the electrochromic material on the semiconductor material enables a color development of a higher density. In order to achieve an adsorption of the electrochromic material in a larger amount, the semiconductor material is preferably given a nanoporous structure to obtain a larger surface area, preferably with a roughness factor of 20 or higher, particularly preferably 150 or higher.

In the second invention, an adsorption of the electrochromic material represented by the formulas (1) to (3) of the invention on such semiconductor material realizes smooth injection and ejection of electrons in the electrochromic element, thereby achieving a change in the optical density of the optical density changing element within a short time. A larger adsorption amount of the electrochromic material on the semiconductor material enables a color development of a higher density. In order to achieve an adsorption of the electrochromic material in a larger amount, the semiconductor material is preferably given a nanoporous structure to obtain a larger surface area, preferably with a roughness factor of 20 or higher, particularly preferably 150 or higher particularly prefer particularly preferably 600 or higher.

Such porous structure can be formed, for example by binding ultra fine particles of a nanometer order. In such case, by optimizing a size and a size dispersion of the employed particles, it is possible to minimize a loss in the transmitted light, caused by absorption or scattering of the electromagnetic wave in the semiconductor material. A size of the employed particles is preferably 100 nm or less, more preferably 1 to 60 nm, and further preferably 2 to 40 nm. Also a dispersion of the size is preferable a single dispersion. It is also possible to improve the response speed of the optical element of the invention, also by optimizing the particle size and the size dispersion.

In the invention, the semiconductor material, in which the electrochromic material is adsorbed, may be employed in two or more layers. In such case, the layers may have a same composition or different compositions. Also a semiconductor material, in which the electrochromic material is adsorbed, may be combined with a semiconductor material in which the electrochromic material is not adsorbed.

An electrochromic material constituting the optical density changing element can be an organic dye such as a viologen dye, a phenothiazine dye, a styryl dye, a ferrocene dye, an anthraquinone dye, a pyrazoline dye, a fluoran dye, or a phthalocyanine dye; a conductive polymer such as polystyrene, polythiophene, polyaniline, polypyrrole, polybenzine, or polyisothianaphthene; or an inorganic compound such as tungsten oxide, iridium oxide, nickel oxide, cobalt oxide, vanadium oxide, molybdenum oxide, titanium oxide, indium oxide, chromium oxide, manganese oxide, Prussian blue, indium nitride, tin nitride, or zirconium nitrochloride. In the second invention, the electrochromic material comprises at least one of compounds represented by formulae (1), (2) and (3) as set forth below in detail, and may also comprise the above-mentioned examples of the electrochromic material.

In the invention, in the case a specified part of an organic compound is called a "group", such part may not be substituted or may be substituted with a substituent (up to a possible maximum number) of one or more kinds. For example an "alkyl group" means a substituted or non-substituted alkyl group.

Such substituent, represented by W, is not particularly restricted and can be, for example, a halogen atom, an alkyl group (including a cycloalkyl group, a bicycloalkyl group, and a tricycloalkyl group), an alkenyl group (including a cycloalkenyl group, and a bicycloalkenyl group), an alkinyl group, an aryl group, a heterocyclic group, a cyano group, a hydroxyl group, a nitro group, a carboxyl group, an alkoxy group, an aryloxy group, a silyloxy group, a heterocyclic oxy group an acyoxy group, a carbamoyloxy group, an alkoxycarbonyloxy group, an aryloxycarbonyloxy group, an amino group (including an alkylamino group, an arylamino group and a heterocyclic amino group), an ammonio group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a phosphono group, a silyl group, a hydrazino group, an ureido group, a boronic acid group ($—B(OH)_2$), a phosphato group ($—OPO(OH)_2$), a sulfato group ($—OSO_3H$, or other known substituents.

Also two Ws may be combined to form a ring (an aromatic ring, a non-aromatic hydrocarbon ring, or a heterocycle, which may further be combined to form a polycondensed rings; such as a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolidine ring, a quinoline ring, a phthalazine ring, a naphthylidine ring, a quinoxaline ring, a quinoxazoline ring, an isoquinoline ring, a carbazole ring, a phenanthridine ring, an acrydine ring, a phenanthroline ring, a thianthrene ring, a chromen ring, a xanthene ring, a phenoxathine ring, a phenothiazine ring, or a phenazine ring).

In the aforementioned substituents W, any hydrogen atom present therein may be substituted by the aforementioned group. Examples of such substituent include —CONHSO$_2$— (a sulfonylcarbamoyl group or a carbonylsulfamoyl group), —CONHCO— (a carbonylcarbamoyl group) and —SO$_2$NHSO$_2$— (a sulfonylsulfamoyl group). More specific examples include an alkylcarbonylaminosulfonyl group (such as acetylaminosulfonyl), an arylcarbonylaminosulfonyl group (such as benzoylaminosulfonyl), an alkylsulfonylaminocarbonyl group (such as methylsulfonylaminocarbonyl), and an arylsulfonylaminocarbonyl group (such as p-methylphenylsulfonylaminocarbonyl).

A viologen dye is a compound represented by structures shown in general formulas (1), (2) and (3):

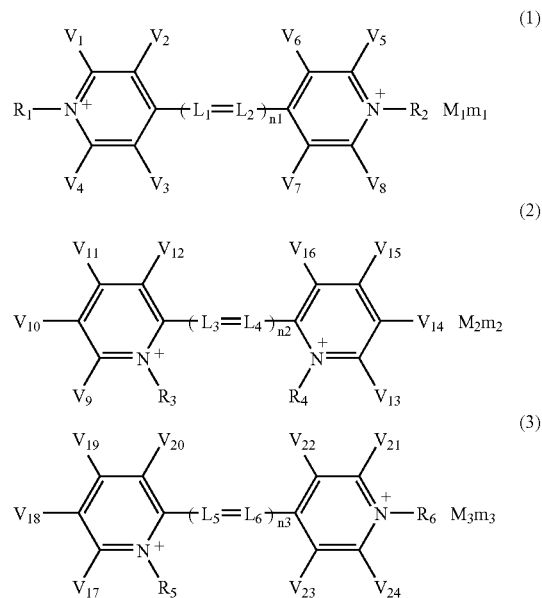

In the general formulas (1), (2) and (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent.

$R_1$, $R_2$, $R_3$, $R_4$, $R_5$ and $R_6$ each independently represents a hydrogen atom, an alkyl group, an aryl group or a heterocyclic group.

$L_1$, $L_2$, $L_3$, $L_4$, $L_5$ and $L_6$ each independently represents a methine group or a nitrogen atom.

$M_1$, $M_2$ and $M_3$ each independently represents a charge balancing counter ion, and $m_1$, $m_2$ and $m_3$ each independently represents a number equal to or larger than 0 necessary for neutralizing the charge of a molecule.

In the first invention, $n_1$, $n_2$ and $n_3$ each independently represents 0, 1 or 2.

In the second invention, $n_1$, $n_2$ and $n_3$ each independently represents 0, 1, 2 or 3. However, in case $n_1$, $n_2$ and $n_3$ are 0, $R_1$, $R_2$, $R_3$, $R_4$, $R_5$ and $R_6$ each independently represents an aryl group, and compounds represented by the general formulas (1) to (3) each independently has at least a group selected from a sulfo group, a phosphono group and a phosphato group. $n_1$, $n_2$ and $n_3$ each independently preferably represents 0 or 1. In case $n_1$-$n_3$ are 2 or larger, methine groups or nitrogens are repeated, but they need not be same.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent, and Vs may be mutually bonded or may form a ring, or V may be bonded with $R_1$-$R_6$ or $L_1$-$L_6$.

The monovalent substituent can be W mentioned above.

$R_1$, $R_2$, $R_3$, $R_4$, $R_5$ and $R_6$ each independently represents a hydrogen atom, an alkyl group, an aryl group or a heterocyclic group, preferably an alkyl group, an aryl group or a heterocyclic group, and further preferably an alkyl group or an aryl group, and particularly preferably an alkyl group. Specific preferred examples of the alkyl group, the aryl group and the heterocyclic group represented as $R_1$-$R_6$ include a non-substituted alkyl group preferably with 1-18 carbon atoms, more preferably with 1-7 carbon atoms and particularly preferably with 1-4 carbon atoms (such as methyl, ethyl, propyl, isopropyl, butyl, isobutyl, hexyl, octyl, dodecyl or octadecyl), and a substituted alkyl group preferably with 1-18 carbon atoms, more preferably with 1-7 carbon atoms and particularly preferably with 1-4 carbon atoms {for example an alkyl group substituted with the aforementioned W as a substituent, in particular an alkyl group having an acid group: the acid group being a group having a dissociable proton and releasing a proton depending upon pKa and an environmental pH, such as a sulfo group, a carboxyl group, a sulfato group, a —CONHSO$_2$— group (sulfonylcarbamoyl group or carbonylsulfamoyl group), a —CONHCO— group (carbonylcarbamoyl group), a —SO$_2$NHSO$_2$— group (sulfonylsulfamoyl group), a sulfonamide group, a sulfamoyl group, a phosphato (—OP(=O)(OH)$_2$) group, a phosphono group (—P(=O)(OH)$_2$) group, a boronic acid group, or a phenolic hydroxyl group: For example there is preferred a proton releasing acidic group capable of dissociation of 90% or more within a pH range of 5-11, more preferably a sulfo group, a carboxyl group, a —CONHSO$_2$— group, a —CONHCO— group, a —SO$_2$NHSO$_2$— group, a phosphato group, or a phosphono group, and further preferably a carboxyl group, a phosphato group, or a phosphono group, and particularly preferably a phosphate group or a phosphono group and most preferably a phosphono group.

Specific preferred examples include an aralkyl group (such as benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (such as an allyl group or a vinyl group (thus a substituted alkyl group including an alkenyl group and an alkinyl group)), a hydroxyalkyl group (such as 2-hydroxyethyl or 3-hydroxypropyl), a carboxyalkyl group (such as carboxymethyl, 2-carboxyethyl, 3-carboxypropyl, or 4-carboxybutyl), a phosphatoalkyl group (such as phosphatomethyl, 2-phosphatoethyl, 3-phosphatopropyl, or 4-phosphatobutyl), a phosphonoalkyl group (such as phosphonomethyl, 2-phosphonoethyl, 3-phosphonopropyl, or 4-phosphonobutyl), an alkoxyalkyl group (such as 2-methoxyethyl or 2-(2-methoxyethoxy)ethyl), an aryloxyalkyl group (such as 2-phenoxyethyl, 2-(4-biphenyloxy)ethyl, 2-(1-naphthoxy)ethyl, 2-(4-sulfophenoxy)ethyl, or 2-(2-phosphophenoxy) ethyl), an alkoxycarbonylalkyl group (such as ethoxycarbonylmethyl, or 2-benzyloxycarbonylethyl), an aryloxycarbonylalkyl group (such as 3-phenoxycarbonylpropyl or 3-sulfophenoxycarbonylpropyl), an acyloxyalkyl group (such as 2-acetyloxyethyl), an acylalkyl group (such as 2-acetylethyl), a carbamoylalkyl group (such as 2-morpholinocarbonylethyl), a sulfamoylalkyl group (such as N,N-dimethylsulfamoylmethyl), a sulfoalkyl group (such as 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, or 3-(2-pyridyl)-3-sulfopropyl), a sulfoalkenyl group, a sulfatoalkyl group (such as 2-sulfatoethyl, 3-sulfatopropyl or 4-sulfatobutyl), a heterocycle-substituted alkyl group (such as 2-(pyrrolidin-2-on-1-yl)ethyl, 2-(2-pyridyl)ethyl, tetrahydrofurfuryl or 3-pyridiniopropyl), an alkylsulfonylcarbamoylalkyl group (such as methanesulfonylcarbamoylmethyl), an acylcarbamoyralkyl group (such as acetylcarbamoylmethyl), an acylsulfamoylalkyl group (such as acetylsulfamoylmethyl), an alkylsulfonylsulfamoylalkyl group (such as methanesulfonylsulfamoylmethyl), an ammonioalkyl group (such as 3-(trimethylammonio)propyl or 3-ammoniopropyl), an aminoalkyl group (such as 3-aminopropyl, 3-(dimethylamino)propyl, or 4-(methylamino)butyl) and a guanidinoalkyl group (such as 4-guanidinobutyl)}.

Preferred examples also include a substituted or non-substituted aryl group preferably with 6 to 20 carbon atoms, more preferably 6 to 10 carbon atoms and particularly preferably 6 to 8 carbon atoms (substituted aryl group can be, for example, an aryl group substituted with W mentioned above as examples of the substituent, preferably an aryl group having an acid group, more preferably an aryl group substituted with a carboxyl group, a sulfo group, a phosphato group or a phosphono group, particularly preferably an aryl group substituted with a phosphato group or a phosphono group, and most preferably an aryl group substituted with a phosphono group; and specific examples including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatodiphenyl or 4-phosphonophenyl), and a substituted or non-substituted heterocyclic group preferably with 1 to 20 carbon atoms, more preferably 3 to 10 carbon atoms and particularly preferably 4 to 8 carbon atoms (substituted heterocyclic group can be, for example, a heterocyclic group substituted with W mentioned above as examples of the substituent, preferably a heterocyclic group having an acid group, more preferably a heterocyclic group substituted with a carboxyl group, a sulfo group, a phosphato group or a phosphono group, particularly preferably a heterocyclic group substituted with a sulfo group, a phosphato group or a phosphono group, and most preferably a heterocyclic group substituted with a phosphono group; and specific examples including 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl or 4-phosphono-2-pyridyl).

Such group may be bonded with another R, $V_1$-$V_{24}$ or $L_1$-$L_6$.

In the second invention, $R_1$, $R_2$, $R_3$, $R_4$, $R_5$ and $R_6$ each is preferably a group having, in its structure, a substituent showing a strong adsorbing property to a nanoporous semiconductor material, and particularly preferably having a sulfo group, a phosphate group or a phosphono group. More specifically, there is preferred an alkyl group, an aralkyl group or an aryl group having such group as a substituent. Further preferably it has two or more of such group (sulfo group, phosphato group or phosphono group), and particularly preferably it has two or more phosphono groups. It is most preferable that $R_1$ and $R_2$, $R_3$ and $R_4$, or $R_5$ and $R_6$ each is an alkyl group, an aralkyl group or an aryl group and both respectively have a phosphono group.

$L_1$, $L_2$, $L_3$, $L_4$, $L_5$ and $L_6$ each independently represents a methine group or a nitrogen atom, preferably a methine group. The methine group represented by $L_1$-$L_6$ may have a substituent, which can be W mentioned above. The substituent can be, for example, a substituted or non-substituted alkyl group with 1 to 15 carbon atoms, preferably 1 to 10 carbon atoms and particularly preferably 1 to 5 carbon atoms (such as methyl, ethyl, 2-carboxyethyl, 2-phosphatoethyl or 2-phosphonoethyl), a substituted or non-substituted aryl group with 6 to 20 carbon atoms, preferably 6 to 15 carbon atoms and further preferably 6 to 10 carbon atoms (such as phenyl, o-carboxyphenyl, o-phosphatophenyl or o-phosphonophenyl), a substituted or non-substituted heterocyclic group with 3 to 20 carbon atoms, preferably 4 to 15 carbon atoms and further preferably 6 to 10 carbon atoms (such as an N,N-dimethylbarbituric acid residue), a halogen atom (such as chlorine, bromine, iodine or fluorine), an alkoxy group with 1 to 15 carbon atoms, preferably 1 to 10 carbon atoms and particularly preferably 1 to 5 carbon atoms (such as methoxy or ethoxy), an amino group with 0 to 15 carbon atoms, preferably 2 to 10 carbon atoms and particularly preferably 4 to 10 carbon atoms (such as methylamino, N,N-dimethylamino or N-methyl-N-phenylamino, or N-methyl-piperadino), an alkylthio group with 1 to 15 carbon atoms, preferably 1 to 10 carbon atoms and particularly preferably 1 to 5 carbon atoms (such as methylthio or ethylthio), and an arylthio group with 6 to 20 carbon atoms, preferably 6 to 12 carbon atoms and particularly preferably 6 to 10 carbon atoms (such as phenylthio or p-methylphenylthio). It may also be bonded with another methine group to form a ring, or bonded with $V_1$-$V_{24}$ or $R_1$-$R_6$.

$n_1$, $n_2$ and $n_3$ each independently represents 0, 1 or 2, preferably 0 or 1, and further preferably 0. In case $n_1$-$n_3$ are 2 or larger, methine groups or nitrogens are repeated, but they need not be same.

$M_1$, $M_2$ and $M_3$ are included in the formula for indicating presence of a cation or an anion when needed to neutralize the ionic charge of the compound. A typical cation can be an inorganic cation such as a hydrogen ion ($H^+$), an alkali metal ion (such as sodium ion, potassium ion, or lithium ion), or an alkali earth metal ion (such as calcium ion), or an organic cation such as an ammonium ion (ammonium ion, tetraalkylammonium ion, triethylammonium ion, pyridinium ion, ethylpyridinium ion or 1,8-diazabicyclo[5.4.0]-7-undecenium ion). An anion can be an inorganic anion or an organic anion for example a halogen anion (such as fluorine ion, chlorine ion or iodine ion), a substituted arylsulfonic acid anion (such as p-toluenesulfonic acid ion or p-chlorobenzenesulfonic acid ion), an aryldisulfonic acid ion (such as 1,3-benzenedisulfonic acid ion, 1,5-naphthalenedisulfonic acid ion, or 2,6-naphthalenedisulfonic acid ion), an alkylsulfuric acid ion (such as methylsulfuric acid ion), sulfuric acid ion, thiocyanic acid ion, perchloric acid ion, tetrafluoroboric acid ion, picric acid ion, acetic acid ion or trifluoromethanesulfonic acid ion. It is also possible to utilize another dye having a charge opposite to that of the ionic polymer or the dye. $CO_2^-$, $SO_3^-$, and $P(=O)(-O^-)_2$ can be represented, when having a hydrogen ion as a counter ion, as $CO_2H$, $SO_3H$ and $P(=O)(-OH)_2$.

$m_1$, $m_2$ and $m_3$ represent numbers of 0 or larger required for balancing the charge, preferably numbers of 0 to 4, more preferably 0 to 2, and 0 in the case an intramolecular salt is formed.

In the following, examples of the viologen dye in the first invention are shown, but the present invention is not limited to such examples.

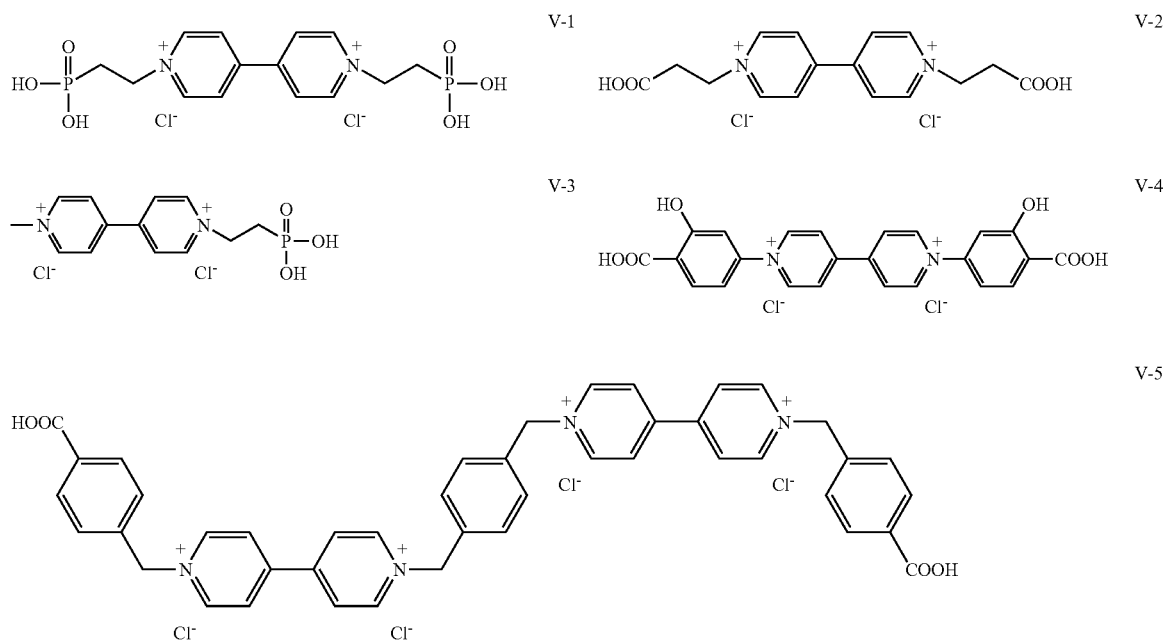

-continued
V-6
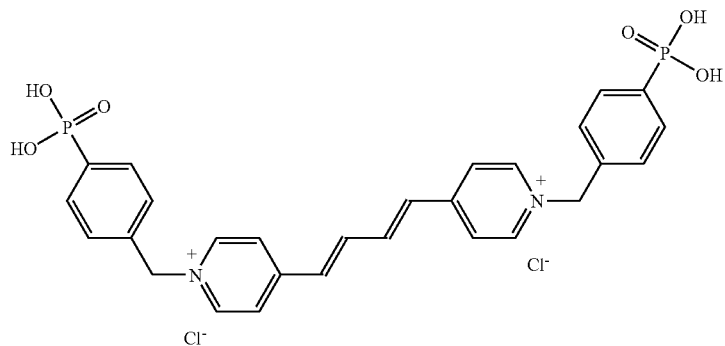
V-7
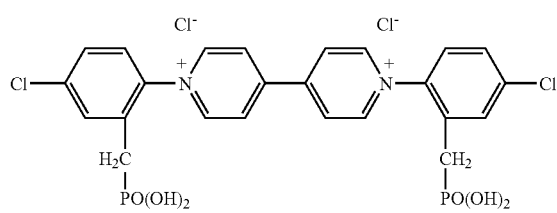
V-8
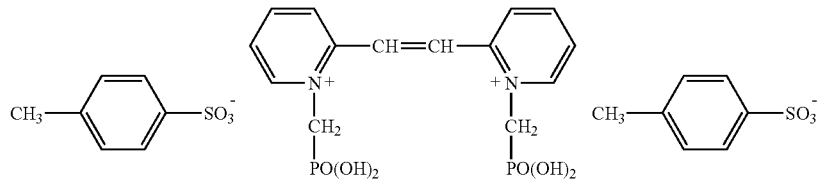
V-9
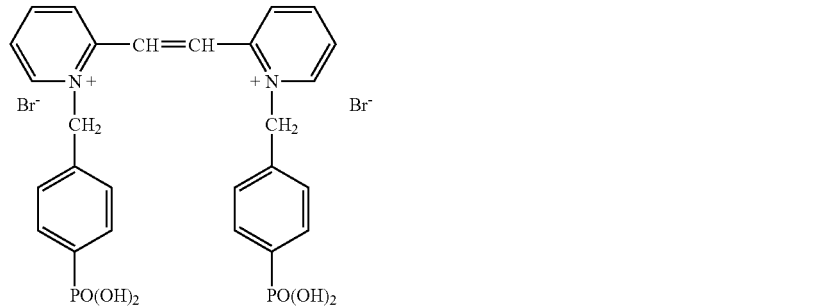
V-10
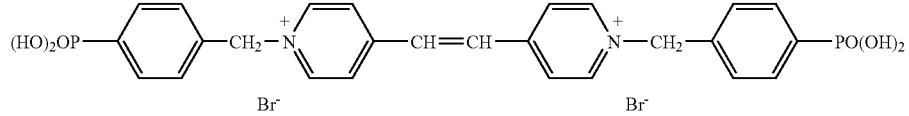
V-11
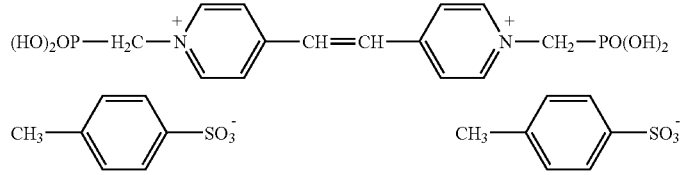
V-12
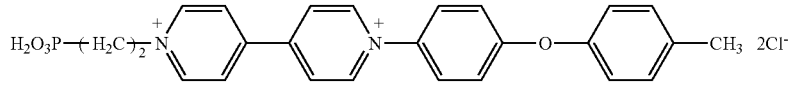
V-13
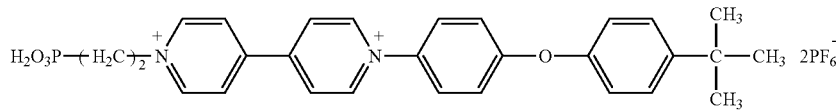

-continued
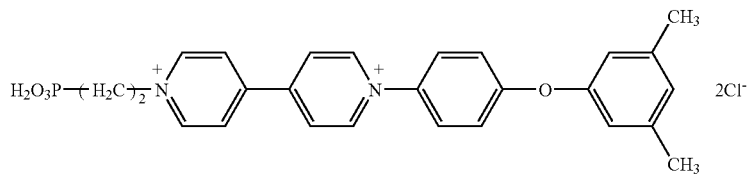
V-14
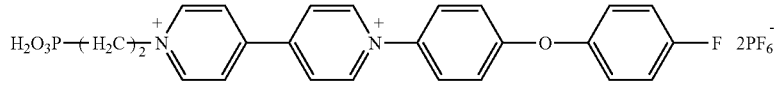
V-15
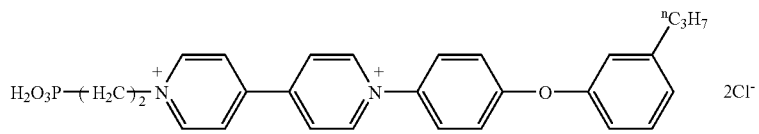
V-16
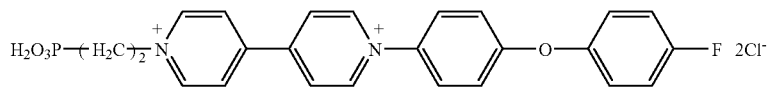
V-17
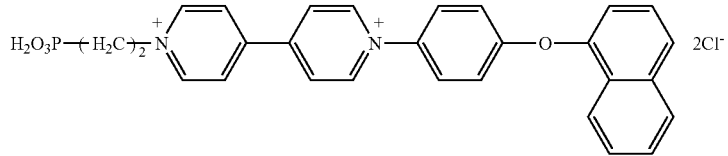
V-18
In the following, examples of the electrochromic materials represented by the general formulas (1), (2) and (3) (viologen dyes) in the second invention are shown, but the present invention is not limited to such examples.
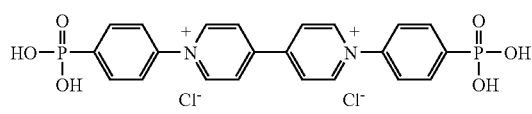
V'-1
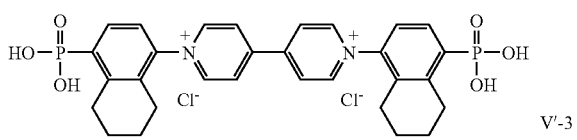
V'-2
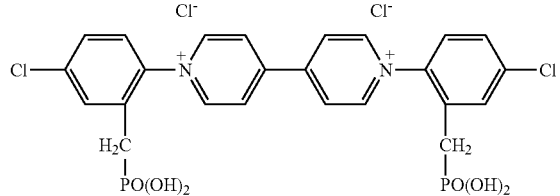
V'-3
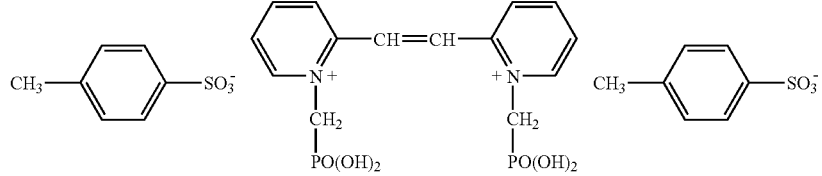
V'-4
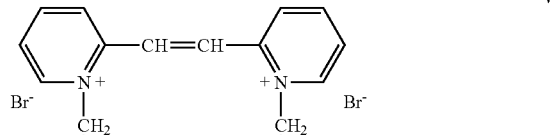
V'-5
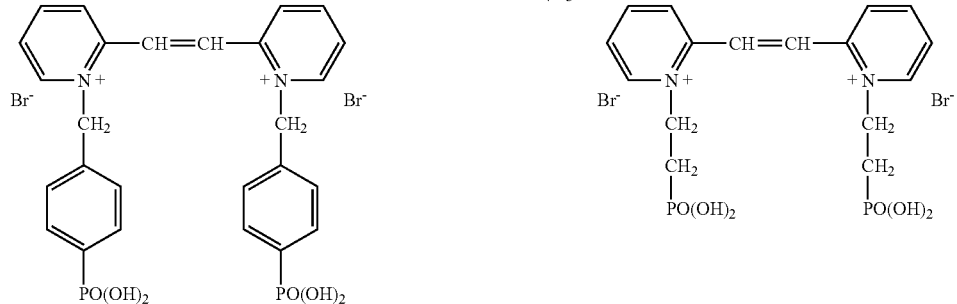
V'-6

-continued

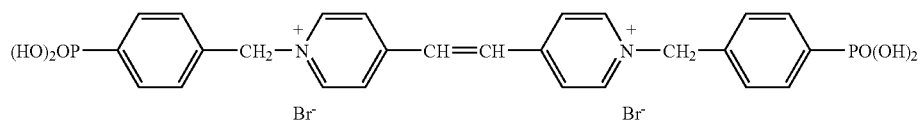
V'-7

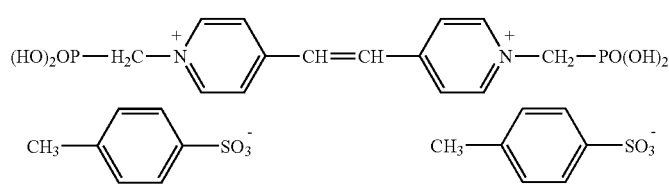
V'-8

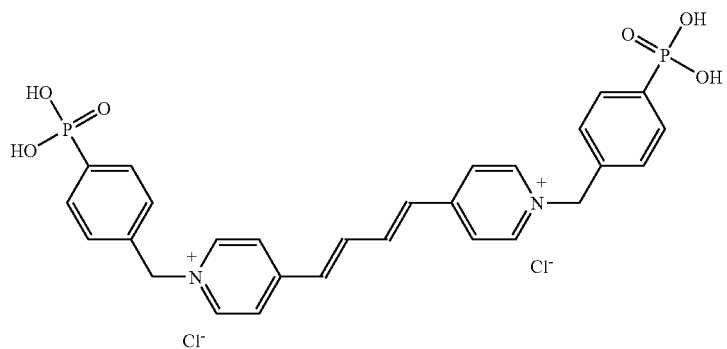
V'-9

In the following, there will be explained preferred materials (preferably dyes) other than those represented by the general formulas (1) to (3).

In a viologen dye other than those represented by the general formulas (1) to (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$) $V_{17}$, $V_{18}$, $V_{19}$, $V_{20}$, $V_{21}$, $V_{22}$, $V_{23}$, $V_{24}$, $R_1$, $R_2$, $R_3$, $R_4$, $R_5$, $R_6$, $L_1$, $L_2$, $L_3$, $L_4$, $L_5$, $L_6$, $M_1$, $M_2$ and $M_3$ as in the general formulas (1), (2) and (3) have same meanings as in the general formulas (1), (2) and (3), but $n_1$, $n_2$ and $n_3$ are 0 and $R_1$, $R_2$, $R_3$, $R_4$, $R_5$ and $R_6$ each independently represent a hydrogen atom, an alkyl group or a heterocyclic group, or in case $R_1$, $R_2$, $R_3$, $R_4$, $R_5$ or $R_6$ is an aryl group, it does not have a sulfo group, a phosphono group or a phosphato group.

In the following, examples of the viologen dye other than those represented by the general formulas (1), (2) and (3), but such examples are not restrictive.

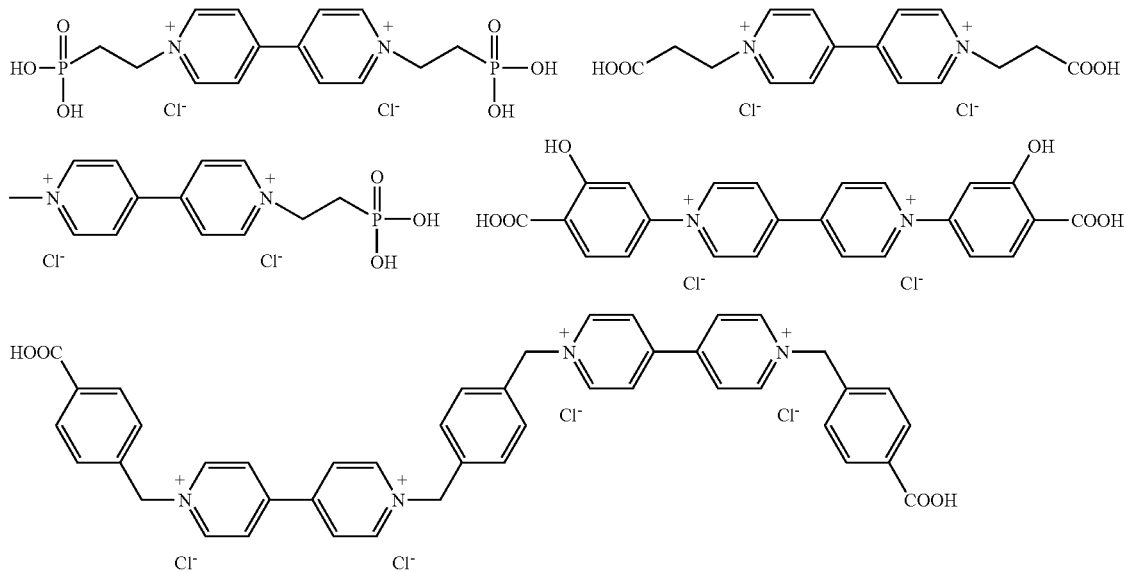

Also compounds (1) to (33) in claim 4 of WO 04/067673 constitute specific examples of preferred viologen dye compound.

A phenothiazine dye is a compound represented by a following general formula (6).

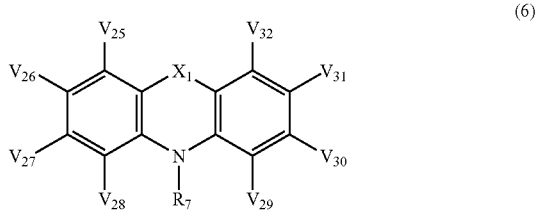

(6)

In the general formulas (6), $V_{25}$, $V_{26}$, $V_{27}$, $V_{28}$, $V_{29}$, $V_{30}$, $V_3$, and $V_{32}$ each independently represents a hydrogen atom or a monovalent substituent, and Vs may be mutually bonded or may form a ring, or V may be bonded with another $R_7$.

The monovalent substituent can be W mentioned above.

$R_7$ represents a hydrogen atom, an alkyl group, an aryl group or a heterocyclic group, preferably an alkyl group, an aryl group or a heterocyclic group, and further preferably an alkyl group or an aryl group, and particularly preferably an alkyl group. Specific preferred examples of the alkyl group, the aryl group and the heterocyclic group represented as $R_1$-$R_7$ include a non-substituted alkyl group preferably with 1-18 carbon atoms, more preferably with 1-7 carbon atoms and particularly preferably with 1-4 carbon atoms (such as methyl, ethyl, propyl, isopropyl, butyl, isobutyl, hexyl, octyl, dodecyl or octadecyl), and a substituted alkyl group preferably with 1-18 carbon atoms, more preferably with 1-7 carbon atoms and particularly preferably with 1-4 carbon atoms {for example an alkyl group substituted with the aforementioned W as a substituent, in particular an alkyl group having an acid group: the acid group being a group having a dissociable proton and releasing a proton depending upon pKa and an environmental pH, such as a sulfo group, a carboxyl group, a sulfato group, a —CONHSO₂— group (sulfonylcarbamoyl group or carbonylsulfamoyl group), a —CONHCO— group (carbonylcarbamoyl group), a —SO₂NHSO₂— group (sulfonylsulfamoyl group), a sulfonamide group, a sulfamoyl group, a phosphato (—OP (=O)(OH)₂) group, a phosphono group (—P(=O)(OH)₂) group, a boronic acid group, or a phenolic hydroxyl group: For example there is preferred a proton releasing acidic group capable of dissociation of 90% or more within a pH range of 5-11, more preferably a sulfo group, a carboxyl group, a —CONHSO₂— group, a —CONHCO— group, a —SO₂NHSO₂— group, a phosphato group, or a phosphono group, and further preferably a carboxyl group, a phosphato group, or a phosphono group, and particularly preferably a phosphate group or a phosphono group and most preferably a phosphono group.

Specific preferred examples include an aralkyl group (such as benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (such as an allyl group or a vinyl group (thus a substituted alkyl group including an alkenyl group and an alkinyl group)), a hydroxyalkyl group (such as 2-hydroxyethyl or 3-hydroxypropyl), a carboxyalkyl group (such as carboxymethyl, 2-carboxyethyl, 3-carboxypropyl, or 4-carboxybutyl), a phosphatoalkyl group (such as phosphatomethyl, 2-phosphatoethyl, 3-phosphatopropyl, or 4-phosphatobutyl), a phosphonoalkyl group (such as phosphonomethyl, 2-phosphonoethyl, 3-phosphonopropyl, or 4-phosphonobutyl), an alkoxyalkyl group (such as 2-methoxyethyl or 2-(2-methoxyethoxy)ethyl), an aryloxyalkyl group (such as 2-phenoxyethyl, 2-(4-biphenyloxy)ethyl, 2-(1-naphthoxy) ethyl, 2-(4-sulfophenoxy)ethyl, or 2-(2-phosphophenoxy) ethyl), an alkoxycarbonylalkyl group (such as ethoxycarbonylmethyl, or 2-benzyloxycarbonylethyl), an aryloxycarbonylalkyl group (such as 3-phenoxycarbonylpropyl or 3-sulfophenoxycarbonylpropyl), an acyloxyalkyl group (such as 2-acetyloxyethyl), an acylalkyl group (such as 2-acetylethyl), a carbamoylalkyl group (such as 2-morpholinocarbonylmethyl), a sulfamoylalkyl group (such as N,N-dimethylsulfamoylmethyl), a sulfoalkyl group (such as 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, or 3-(2-pyridyl)-3-sulfopropyl), a sulfoalkenyl group, a sulfatoalkyl group (such as 2-sulfatoethyl, 3-sulfatopropyl or 4-sulfatobutyl), a heterocycle-substituted alkyl group (such as 2-(pyrrolidin-2-on-1-yl)ethyl, 2-(2-pyridyl) ethyl, tetrahydrofurfuryl or 3-pyridiniopropyl), an alkylsulfonylcarbamoylalkyl group (such as methanesulfonylcarbamoylmethyl), an acylcarbamoylalkyl group (such as acetylcarbamoylmethyl), an acylsulfamoylalkyl group (such as acetylsulfamoylmethyl), an alkylsulfonylsulfamoylalkyl group (such as methanesulfonylsulfamoylmethyl), an ammonioalkyl group (such as 3-(trimethylammonio)propyl or 3-ammoniopropyl), an aminoalkyl group (such as 3-aminopropyl, 3-(dimethylamino)propyl, or 4-(methylamino)butyl) and a guanidinoalkyl group (such as 4-guanidinobutyl)}.

Preferred examples also include a substituted or non-substituted aryl group preferably with 6 to 20 carbon atoms, more preferably 6 to 10 carbon atoms and particularly preferably 6 to 8 carbon atoms (substituted aryl group can be, for example, an aryl group substituted with W mentioned above as examples of the substituent, preferably an aryl group having an acid group, more preferably an aryl group substituted with a carboxyl group, a phosphate group or a phosphono group, particularly preferably an aryl group substituted with a phosphato group or a phosphono group, and most preferably an aryl group substituted with a phosphono group; and specific examples including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatodiphenyl or 4-phosphonophenyl), and a substituted or non-substituted heterocyclic group preferably with 1 to 20 carbon atoms, more preferably 3 to 10 carbon atoms and particularly preferably 4 to 8 carbon atoms (substituted heterocyclic group can be, for example, a heterocyclic group substituted with W mentioned above as examples of the substituent, preferably a heterocyclic group having an acid group, more preferably a heterocyclic group substituted with a carboxyl group, a phosphato group or a phosphono group, particularly preferably a heterocyclic group substituted with a phosphato group or a phosphono group, and most preferably a heterocyclic group substituted with a phosphono group; and specific examples including 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl or 4-phosphono-2-pyridyl).

It may also be bonded to $V_{25}$-$V_{32}$.

$X_1$ represents a sulfur atom, an oxygen atom, a nitrogen atom (N—Ra), a carbon atom (CVaVb), or a selenium atom, preferably a sulfur atom. Ra represents a hydrogen atom, an alkyl group, an aryl group or a heterocyclic group, and can be and is preferably similar to $R_1$-$R_7$ mentioned above. Va and Vb each represents a hydrogen atom or a monovalent substituent, and can be and is preferably similar to $V_1$-$V_{32}$ and $R_1$-$R_7$ mentioned above.

$M_4$ is included in the formula for indicating presence of a cation or an anion when needed to neutralize the ionic charge of the compound. A typical cation can be an inorganic cation such as a hydrogen ion ($H^+$), an alkali metal ion (such as sodium ion, potassium ion, or lithium ion), or an alkali earth metal ion (such as calcium ion), or an organic cation such as an ammonium ion (ammonium ion, tetraalkylammonium ion, triethylammonium ion, pyridinium ion, ethylpyridinium ion or 1,8-diazabicyclo[5.4.0]-7-undecenium ion). An anion can be an inorganic anion or an organic anion for example a halogen anion (such as fluorine ion, chlorine ion or iodine ion), a substituted arylsulfonic acid anion (such as p-toluenesulfonic acid ion or p-chlorobenzenesulfonic acid ion), an aryldisulfonic acid ion (such as 1,3-benzenedisulfonic acid ion, 1,5-naphthalenedisulfonic acid ion, or 2,6-naphthalenedisulfonic acid ion), an alkylsulfuric acid ion (such as methylsulfuric acid ion), sulfuric acid ion, thiocyanic acid ion, perchloric acid ion, tetrafluoroboric acid ion, picric acid ion, acetic acid ion or trifluoromethanesulfonic acid ion. It is also possible to utilize another dye having a charge opposite to that of the ionic polymer or the dye. $CO_2^-$, $SO_3^-$, and $P(=O)(-O^-)_2$ can be represented, when having a hydrogen ion as a counter ion, as $CO_2H$, $SO_3H$ and $P(=O)(-OH)_2$.

$m_4$ represents a number of 0 or larger required for balancing the charge, preferably a number of 0 to 4, more preferably 0 to 2, and 0 in case an intramolecular salt is formed.

In the following, examples of the phenothiazine dye are shown, but the present invention is not limited to such examples.

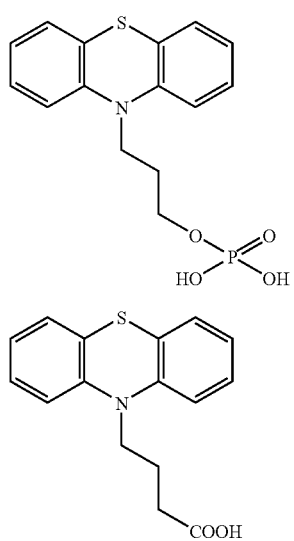

P-1

P-2

A styryl dye is a compound having a basic skeleton represented by a following formula (7).

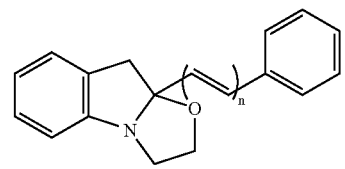

(7)

In the formula, n represents 1-5. This compound may have an arbitrary substituent in an arbitrary position, and it is particularly preferable to have an adsorbing group such as a carboxyl group, a sulfonic acid group or a phosphonic acid group. Following compounds are shown as specific examples, but the invention is not limited to such examples.

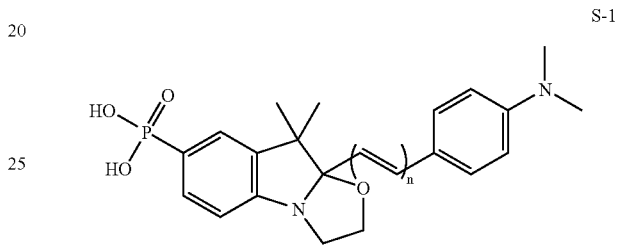

S-1

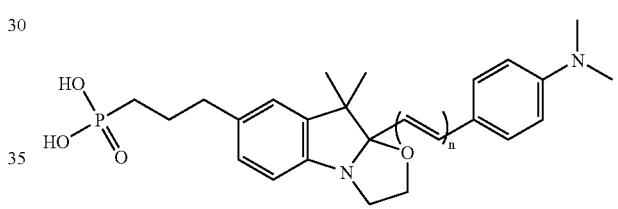

S-2

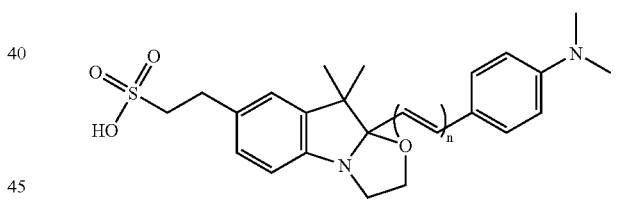

S-3

Among such electrochromic materials, an organic compound can control its absorption wavelength by changing substituents thereof. It is also preferable to employ two or more electrochromic materials for changing the optical density, whereby the optical density changing element can change the optical densities at different wavelengths.

In the case of utilizing an optical element of the first invention as a light regulating element for a photographing unit (preferably a camera unit), it preferably has absorption characteristics close to neutral gray corresponding to a uniform light absorption, and the optical density changing element is preferably capable of absorbing visible light, preferably visible light of plural different wavelengths, more preferably blue, green and red light and further preferably satisfies the conditions of the average optical densities as described in the foregoing solving means (1) or (2) and/or (3). The solving means (1) or (2) and/or (3) can be realized by a combination of plural materials capable of an electron exchange and showing a change in the spectrum within a wavelength range range of 400 to 700 nm as a result of the electron exchange. Preferred examples of the combination of two or more kinds include a viologen dye other than that of the invention dye/phenothiazine dye, viologen dye/ferrocene dye, phthalocyanine dye/Prussian blue, viologen dye/nickel oxide, viologen dye/iridium oxide, tungsten oxide/phenothiazine dye, viologen dye/phenothiazine dye/styryl dye, two viologen dyes (different in substituent)/phenothiazine dye, two viologen dyes (different in substituent)/styryl dye, and two viologen dyes (different in substituent)/nickel oxide.

In the case of utilizing an optical element of the second invention as a light regulating element for a photographing unit (preferably a camera unit), it preferably has absorption characteristics close to neutral gray corresponding to a uniform light absorption, and the optical density changing element is preferably capable of absorbing visible light, preferably visible light of plural different wavelengths, and more preferably blue, green and red light. This can be realized by a combination of plural material in the visible range, including a material represented by the formulas (1)-(3) of the invention. A material usable in addition to the material represented by the formulas (1)-(3) of the invention (namely giving a preferred combination of two or more kinds) can be, for example, a phenothiazine dye, a ferrocene dye, a viologen dye other than that of the invention, a phthalocyanine dye/Prussian blue, nickel oxide, a viologen dye other than that of the invention/phenothiazine dye (hereafter giving a combination of three kinds), a viologen dye other than that of the invention/ferrocene dye, a viologen dye other than that of the invention/nickel oxide, a viologen dye other than that of the invention/iridium oxide, tungsten oxide/phenothiazine dye, a viologen dye other than that of the invention/phenothiazine dye/styryl dye, two viologen dyes other than that of the invention (different in substituent)/phenothiazine dye, two viologen dyes other than that of the invention (different in substituent)/styryl dye, and two viologen dyes other than that of the invention (different in substituent)/nickel oxide.

Also in order to accelerate an electrochemical reaction of such electrochromic material, an auxiliary compound that can be oxidized or reduced may be present in the optical density changing element. The auxiliary compound may or may not show a change in the optical density in $\lambda$=400-700 nm by oxidation or reduction. The auxiliary compound may be present on the metal oxide like the electrochromic material, or may be dissolved in the electrolyte or may singly form a layer on an electric conductive layer.

It is preferable that the auxiliary compound is provided on the anode of the electrochromic element, is capable of an electron exchange and does not show a change in an absorption spectrum in a spectral range of 400-700 nm as a result of an electron exchange.

An electrolyte constituting the optical density changing element is preferably constituted of a solvent and a supporting electrolyte. The supporting electrolyte executes a charge exchange and is never involved in an electrochemical reaction, thereby serving to increase conductivity. The solvent is preferably a polar solvent, and can specifically be water, an alcohol such as methanol or ethanol, a carboxylic acid such as acetic acid, acetonitrile, propionitrile, glutaronitrile, adiponitrile, methoxyacetonitrile, diemthylacetamide, methylpyrrolidinone, formamide, N,N-dimethylformamide, dimethyl sulfoxide, dimethoxyethane, propylene carbonate, ethylene carbonate, γ-butyrolactone, tetrahydrofuran, dioxolane, trimethyl phosphate, pyridine, hexamethylenic triamide or polyethylene glycol.

The supporting electrolyte serves as an ion and functions as a charge carrier in the solvent, and is a salt formed by a combination of easily ionizable anion and cation. The cation can be a metal ion represented by $Li^+$, $Na^+$, $K^+$, $Rb^+$ or $Cs^+$, or a quaternary ammonium ion represented by tetrabutylammonium ion. Also the anion can be a halogen represention by $Cl^-$, $Br^-$, $I^-$ or $F^-$, a sulfate ion, a nitrate ion, a perchlorate ion, a tosylate ion, a tetrafluoroborate ion, or a hexafluorophosphate ion. Other electrolytes include a fused salt system represented by LiCl/KCl, a solid electrolyte system represented by an ionic conductive member or an ultra ionic conductive memter, and a solid polymer electrolyte system represented by a membrane-shaped ionic conductive material such as an ion exchange membrane. In addition, charge transport materials can be used in place of the electrolyte.

In the optical element of the invention, it is preferable to maintain an optical density at $\lambda$=400 nm in a decolored state at 0.2 or less (preferably 0.125 or less), by suitably combining the materials of the optical density changing element, namely by optimizing the types of the substrate, the conductive layer and the electrochromic material, and by optimizing the type and the particle size of the semiconductor material. It is also preferable, in a similar manner, to maintain all of an average optical density at $\lambda$=400-500 nm in a decolored state, an average optical density at $\lambda$=500-600 nm in a decolored state, and an average optical density at $\lambda$=600-700 nm in a decolored state, at 0.1 or less. On the other hand, in a colored state in response to an electromagnetic wave irradiation, an average optical density in $\lambda$=400-700 nm is preferably 0.5 or higher, more preferably 0.8 or higher, and particularly preferably 0.95 or higher.

In the optical element of the invention, the optical density changing element and the electromotive force generating element may be connected either directly or through a circuit having an amplifying or protective function. Also there may be adopted a circuit configuration having a resistor connected parallel to the optical density changing element thereby promoting cancellation of the applied voltage when the light irradiation is terminated.

The optical element of the invention can be applied to an automotive window material, a display apparatus or a camera-related optical element. The efficacy of the optical element of the invention can be exhibited particularly in a camera-related optical element, which is applicable to a photographing unit (preferably a camera unit) such as a large- or medium-format camera, a single-lens reflex camera, a compact camera, a film with lens, a digital camera, a broadcasting camera, a movie film camera, a movie digital camera, a photographing unit (preferably a camera unit) for a cellular phone, or an 8 mm movie camera. Another example in which the efficacy of the optical element can be exhibited is a simple photographing system not requiring a complex control mechanism, represented by a film with lens. Still another example is a digital camera utilizing a CCD or a CMOS device as an image pickup device, in which the optical element is effective for covering a limited dynamic range of the image pickup device.

In the case of mounting the optical element of the invention in a photographing unit, the electrochromic element is preferably positioned on an optical axis of a photographing lens. Also the electrochromic element has a hue in a colored state close to a hue of a photorecording medium contained in the photographing unit. The photorecording medium means, in case the photographing unit is a film with lens, a color negative film loaded in the film with lens, or, in case of an electronic still camera, a CCD or a CMOS device in such electronic still camera, or, in case of a cellular phone with a camera, a CCD in such camera. A hue of the electrochromic element in the colored state and a hue of the photorecording medium contained in the photographing unit preferably have an overlapping as large as possible. Therefore, "neutral gray" in the invention includes not only a case where the absorption spectrum of the electrochromic element in the colored state is uniform over an entire wavelength range of 400 to 700 nm (uniform means that an average optical density in 400-700 nm and an optical density at each wavelength show small difference, for example 0.1) but also a case where the hue of the element in the colored state shows a large overlapping with that of the recording medium in the photographing unit, thereby realizing a substantially "neutral gray" state for the photographing unit.

EXAMPLES

In the following, the first invention will be explained by examples, but the present invention is naturally not limited to such examples.

Example 1-1

A method for preparing the electrochromic element of the invention will be explained on a sample 1-102 (present invention) and a sample 1-101 (comparative example).

(1) Preparation of Sample 1-101 (Comparative Example)

A sample 1-101 (comparative example) was prepared by a procedure of (i) coating of tin oxide nanoparticles for cathode, (ii) coating of tin oxide nanoparticles for anode, (iii) adsorption of electrochromic dye, and (iv) assembly of an electrochromic element.

(i) Coating of Tin Oxide Nanoparticles for Cathode

In an aqueous dispersion of tin oxide of a diameter of about 40 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transpatent conductive glass, the coating liquid was coated uniformly so as to obtain an amount of tin oxide of 9 g/m². After the coating, the coated glass substrate was calcined for 30 minutes at 450° C. to eliminate the polymer, thereby obtaining a tin oxide nanoporous electrode. The electrode prepared in the aforementioned process had a surface roughness factor of about 750.

(ii) Coating of Tin Oxide Nanoparticles for Anode

In an aqueous dispersion of tin oxide of an average diameter of about 5 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transparent conductive glass, the coating liquid was coated uniformly, then heated to 450° C. over 100 minutes and calcined for 30 minutes at 450° C. to eliminate the polymer. The coating and the calcining were repeated until tin oxide reached a total coating amount of 7 g/m², thereby obtaining a tin oxide nanoporous electrode. The electrode prepared in the aforementioned process had a surface roughness factor of about 750.

(iii) Adsorption of Electrochromic Dye

Following electrochromic dyes (V-1) and (P-1) were employed. The electrochromic dye V-1 has a property of developing color by being reduced at the cathode (− pole), while the electrochromic dye P-1 has a property of developing color by being oxidized at the anode (+ pole). The electrochromic dyes V-1 and P-1 have mutually different absorption spectra in the colored state. Thus, under color development, the two electrochromic materials show changes in the optical densities at different wavelengths.

Electrochromic Dyes (V-1) and (P-1)

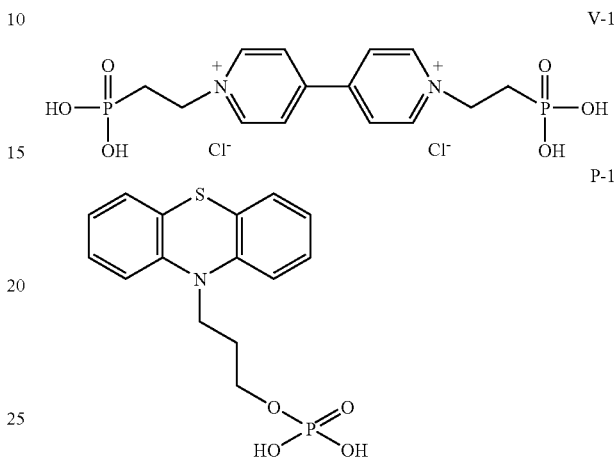

V-1 and P-1 were respectively dissolved in water and in a mixed solvent of methanol, with a concentration of 0.02 ml/l, and the tin oxide porous electrode prepared in (i) was immersed in the V-1 solution while the tin oxide porous electrode prepared in (ii) was immersed in the P-1 solution, and adsorption was conducted for 3 hours at 40° C. After the adsorption, the glass was rinsed with respective solvent, and was dried under vacuum.

(iv) Assembly of Electrochromic Element

Figure 4:
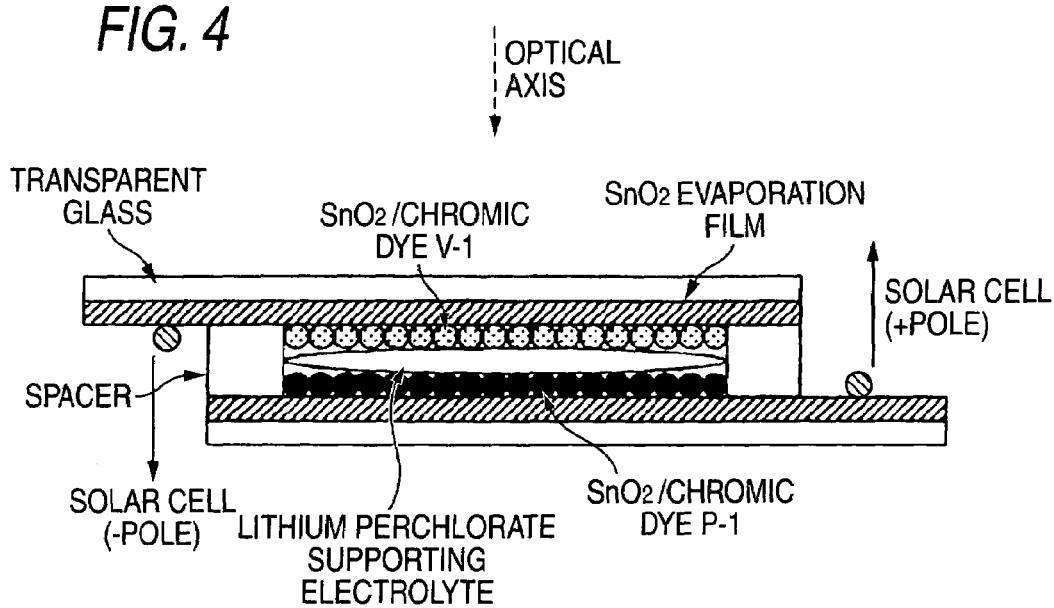
FIG. 4 is a schematic cross-sectional view showing a configuration of an example (light regulating filter) of an optical density changing element of the present invention.

The tin oxide porous nanoporous electrode adsorbing the dye V-1 and the tin oxide porous nanoporous electrode adsorbing the dye P-1 were opposed as shown in FIG. 4, and, in a gap therebetween, a 0.2 mol/l γ-butyrolactone solution of lithium perchlorate was sealed as an electrolyte to obtain a sample 1-101 of the electrochromic element. The sample 1-101 developed a color by connecting the tin oxide porous nanoporous electrode adsorbing the dye V-1 to a (−) pole and the tin oxide porous nanoporous electrode adsorbing the dye P-1 to a (+) pole.

(2) Preparation of Sample 1-102 (Present Invention)

A sample 1-102 (present invention) was prepared by a procedure of (i) coating of tin oxide nanoparticles for cathode, (ii) coating of tin oxide nanoparticles for anode, (iii) adsorption of electrochromic dye, and (iv) assembly of an electrochromic element. The (iii) adsorption of electrochromic dye alone was conducted in a process different from that for the sample 1-101 (comparative example), while other processes were conducted in the same manner as in the preparation of the sample 1-101 (comparative example).

(iii) In the adsorption of the electrochromic dye, a 0.02 mol/l aqueous solution of the aforementioned electrochromic dyes V-7 and V-8 was employed instead of the 0.02 mol/l aqueous solution of the electrochromic dye V-1 employed in the sample 1-101 (comparative example). Other conditions were made same as in the sample 1-101 (comparative example).

Optimum voltages were applied to the samples 1-101 and 1-102 to cause color development. Color balance obtained in this state is shown in Table 1-1. (+) indicates a case where an average optical density in the wavelength range of 450-470 nm, an average optical density in the wavelength range of 540-560 nm, and an average optical density in the wavelength range of 630-650 nm in the colored state of each sample have a fluctuation of 0.3 or less, and (−) indicates a case a fluctuation of larger than 0.3.

TABLE 1-1

| | color balance |
|---|---|
| sample 1-101 (comparative example) | − |
| sample 1-102 (invention) | + |

It is clarified that the sample 1-102 of the invention shows a colored state closer, than the comparative example 1-101, to the spectral sensitivity of the color negative film.

Example 1-2

There will be shown an example of mounting the electrochromic element 1-102 of the present invention on a film with lens.

Figure 2:
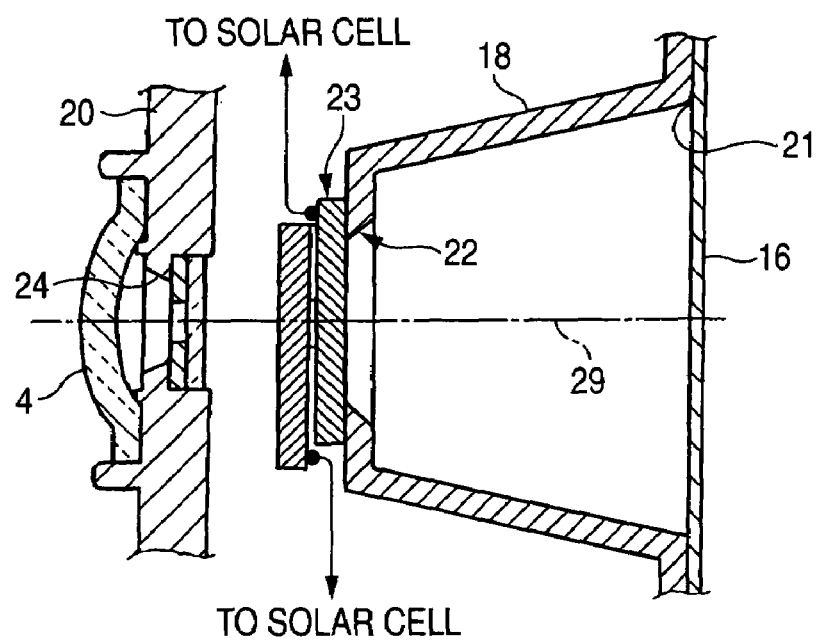
FIG. 2 is a schematic cross-sectional view of a principal portion of a film unit with lens having an optical element of the present invention.
Figure 3:
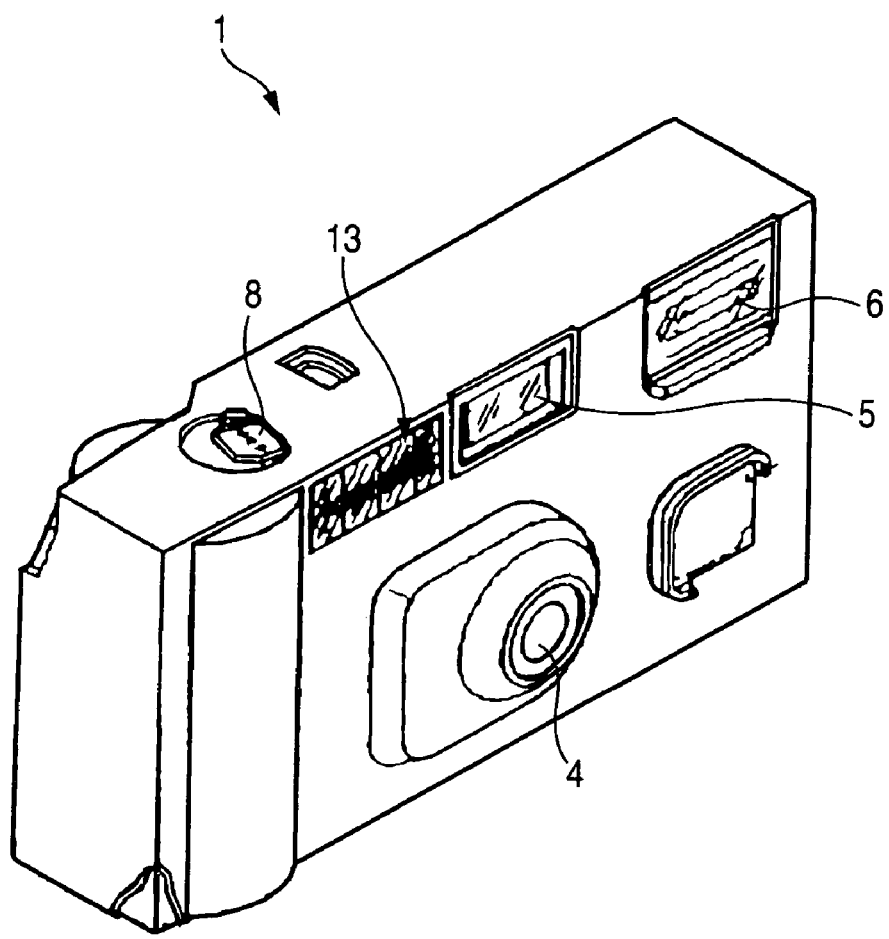
FIG. 3 is an external view of a principal portion of a film unit with lens having an optical element of the present invention.

The film unit with lens of the present example is equipped, as shown in FIGS. 2 and 3, with (1) a light regulating filter 23 (electrochromic element) and (2) a solar cell 13 (electromotive force generating element). The solar cell 13 provided outside the unit generates an electromotive force corresponding to the intensity of the external light, and the light regulating filter 23 regulates the light amount arriving at the color negative film 16 according to such electromotive force thereby preventing an overexposure under a high luminance environment.

(1) Electrochromic Element Sample 1-102

A sample was prepared in the same manner as in Example 1-1.

(2) Solar Cell

Figure 5:
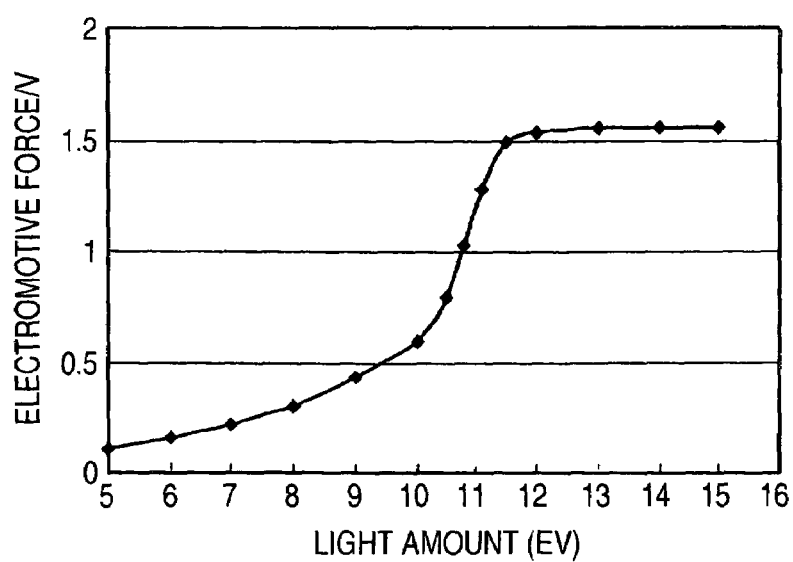
FIG. 5 is a graph showing electromotive response characteristics of a solar cell employed in Example 1-1.

As the solar cell, there was employed a silicon cell SS-3012DS (manufactured by Sinonar Co.), and unit cells of such solar cell were serially connected to obtain an electromotive force of about 1.5 V Electromotive characteristics of the used solar cell to a pseudo solar light (a xenon lamp and an AM1.5 spectral filter manufactured by Oriel Co.) are shown in FIG. 5 as a function of light amount.

The (1) light regulating filter and the (2) solar cell mentioned above were used to prepare a film unit with lens of a configuration shown in Table 1-2. It had a film sensitivity of ISO 1600, a diaphragm of F8 and a shutter speed of 1/85 sec. The photographing system constituted as explained above provides a negative image of an optimum density in a photographing operation under a condition of EV=8.4.

TABLE 1-2

| sample No. | solar cell | light regulating filter |
|---|---|---|
| 1-101 (comp. ex.) | absent | filter absent |
| 1-102 (invention) | present | filter present |

Figure 6:
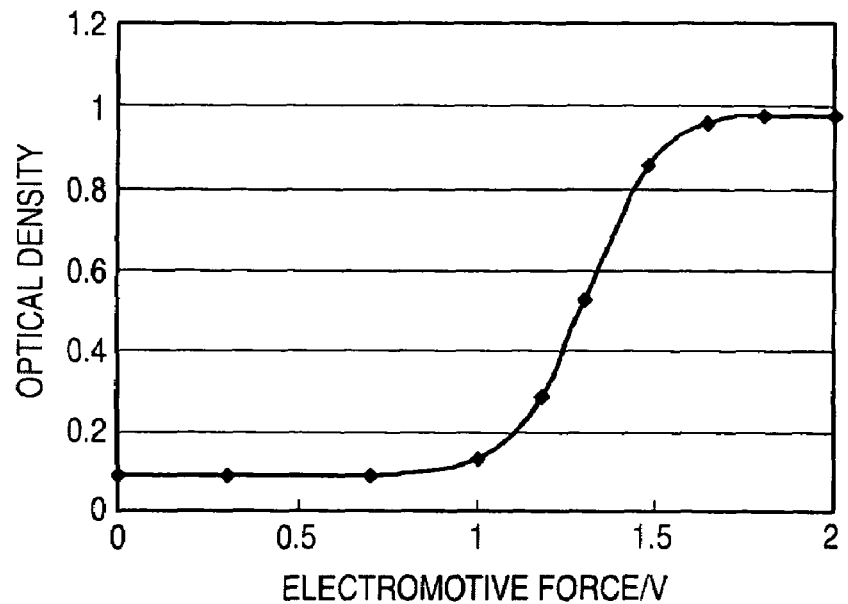
FIG. 6 is a graph showing electromotive response characteristics of a light regulating filter prepared in Example 1-1.
Figure 7:
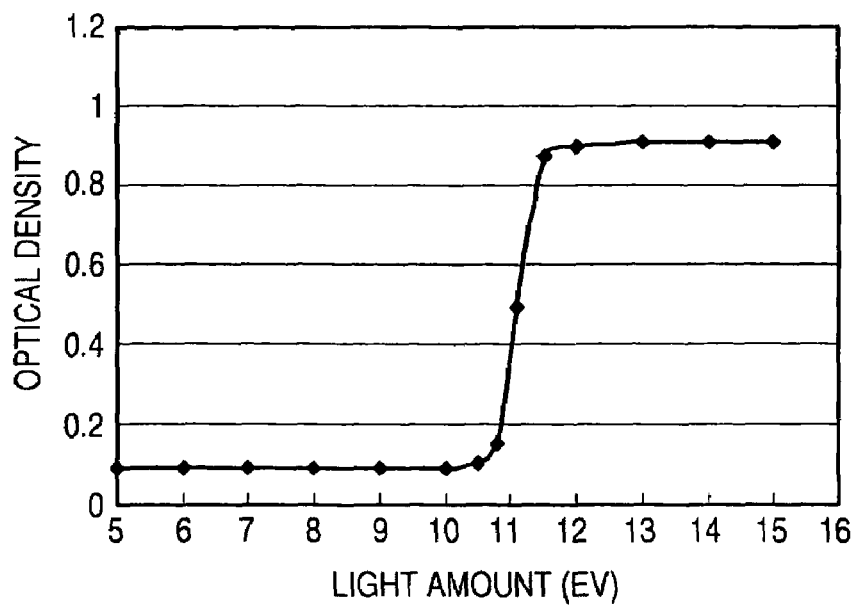
FIG. 7 is a graph showing electromotive response characteristics of an optical element of the present invention prepared in Example 1-1.

Optical density characteristics of the optical element employed in the sample 1-102 are shown in FIG. 6, as a function of the electromotive force of the solar cell. Also optical density response characteristics of the optical element, constituted of the solar cell and the light regulating filter are shown in FIG. 7, as a function of the light amount. The indicated optical density is an average over λ=400-700 nm. Also Table 1-3 indicates an increase in so-called "aperture stop number", employed in ordinary photographing systems, corresponding to each increase of the optical density. For example, an increase by +1 in the aperture stop number corresponds to a reduction of the transmitted light amount to ½, or to an increase in the optical density by 0.3. As shown in FIG. 7, the aperture stop number of the optical element, being +0.3 when the light is intercepted, increased to +2.9 under an irradiation of the light of EV=11.5 and to +3.0 under an irradiation of the light of EV=12.0 or higher. Such change had a response time of 5 seconds. EV is a value indicating a brightness, and is calculated from a following equation (2) from a brightness L represented by a practical unit "lux" for an illumination intensity:

$$EV = \log_2(L/2.4) \qquad (2)$$

In relation to the aperture stop number mentioned above, an increase by +1 in the aperture stop number corresponds to a decrease by 1 of the EV value of the light received through the optical element.

The aforementioned units 1-101, 1-102 were subjected to photographing operations under brightness conditions of EV=6.4 (corresponding to a dark indoor environment) to 15.4 (corresponding a bright summer outdoor condition), and developed in a CN-16 developing process of Fuji Photo Film Co. for 3 minutes and 15 seconds. Exposure levels obtained on the negative film are shown in Table 3. An exposure level indicates an appropriateness of the negative density after the processing, with an optimum negative density represented by 0. In the photographing system employed in the present example, there is obtained an optimum negative density, or an exposure level=0 in a photographing operation under a condition EV=8.4. An exposure level +1 means a density higher than an optimum gray density by 1 stop (corresponding to an optical density higher by 0.3), and an exposure level −1 means a density lower than an optimum gray density by 1 stop (corresponding to an optical density lower by 0.3).

TABLE 1-3

| photographing condition sample | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
|---|---|---|---|---|---|---|---|---|---|---|
| 1-101(comp. ex.) | −2.0 | −1.0 | 0 | +1.0 | +2.0 | +3.0 | +4.0 | +5.0 | +6.0 | +7.0 |
| 1-102(invention) | −2.3 | −1.3 | −0.3 | +0.7 | +1.7 | +0.4 | +1.0 | +2.0 | +3.0 | +4.0 |

In the case of obtaining a print from thus obtained negative image, a certain aberration in the exposure level is correctable. More specifically, a correction at the printing operation is possible for negative films of exposure levels within a range from −1 to +4, and a "successfully taken photograph" can be obtained. In the case the exposure level is not within the aforementioned range, a sufficient correction cannot be realized at the printing operation, thus resulting in a "failed photograph". Table 1-4 shows whether a photograph printed from the negative photographed under the aforementioned condition is successful or not, wherein (+) indicates a success and (−) indicates a failure.

showed a superior color balance in comparison with the sample 1-101 (comparative example).

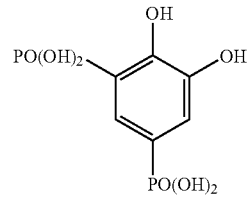

R-1

TABLE 1-4

| photographing condition sample | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
|---|---|---|---|---|---|---|---|---|---|---|
| 1-101(comp. ex.) | − | + | + | + | + | + | + | − | − | − |
| 1-102(invention) | − | − | + | + | + | + | + | + | + | + |

Table 1-4 indicates following results. The sample 1-102 having the light regulating system of the invention, in comparison with the comparative example 1-101 not having the light regulating system, showed a somewhat narrower photographable range under conditions of lower illumination intensity (conditions of smaller EV) but a much wider photographable range under conditions of higher illumination intensity (conditions of larger EV), thus realizing a camera system of a wider photographable range in total.

Example 1-3

The present example employs, as an anode, a material which does not change the optical density in the absorption spectrum within a wavelength range of 400-700 nm as a result of electron exchange (colorless redox material).

A sample 1-103 and sample 1-104 of the invention was prepared in the same manner as the sample 1-101 (comparative example) in the Example 1-1, except for a difference in (iii) adsorption of the electrochromic dye.

More specifically, for the preparation of the sample 1-103, in (iii) adsorption of the electrochromic dye, a 0.02 mol/l aqueous solution of the aforementioned electrochromic dyes V-7, V-8 and V-10 was employed instead of the 0.02 mol/l aqueous solution of the electrochromic dye V-1 employed in the sample 1-101 (comparative example). Also the 0.02 ml/l methanol solution of the electrochromic dye P-1 employed in the sample 1-101 (comparative example) was replaced by a water-methanol (mixing ratio 1:1) solution of a following colorless redox material R-1. Other conditions were same as in the sample 1-101 (comparative example).

The sample 1-104 was prepared by replacing, in the (iii) adsorption of the electrochromic dye, the 0.02 mol/l aqueous solution of the electrochromic dye V-1 employed in the sample 1-101 (comparative example) with a 0.02 mol/l aqueous solution of 1-phosphoneethyl-1'-(4-phenoxyphenyl)-4,4'-bipyridinium dichloride and by replacing the 0.02 mol/l methanol solution of the electrochromic dye P-1 with a 0.02 mol/l water/methanol (mixing ratio 1:1) of a following colorless redox material R-1. Other conditions were same as those in the sample 1-101 (comparative example).

In an experiment similar to that in Example 1-1, each of the sample 1-103 and the sample 1-104 (present invention)

Example 1-4

The present example employs a dry battery and a phototransistor as the electromotive force generating element, in place for the solar cell. The solar cell in Example 1-2 was replaced by a smaller phototransistor (PT380 manufactured by Sharp Inc.), and a dry battery for an electronic strobe light (U-3, 1.5V) was employed as a power source. A light regulating filter same as in Example 1-1 was employed. In a comparative experiment on the film with lens in Example 1-2, the present example showed a similar effect in the photographing operation and decreased a risk that the solar cell is covered by a finger.

Example 1-5

Figure 8:
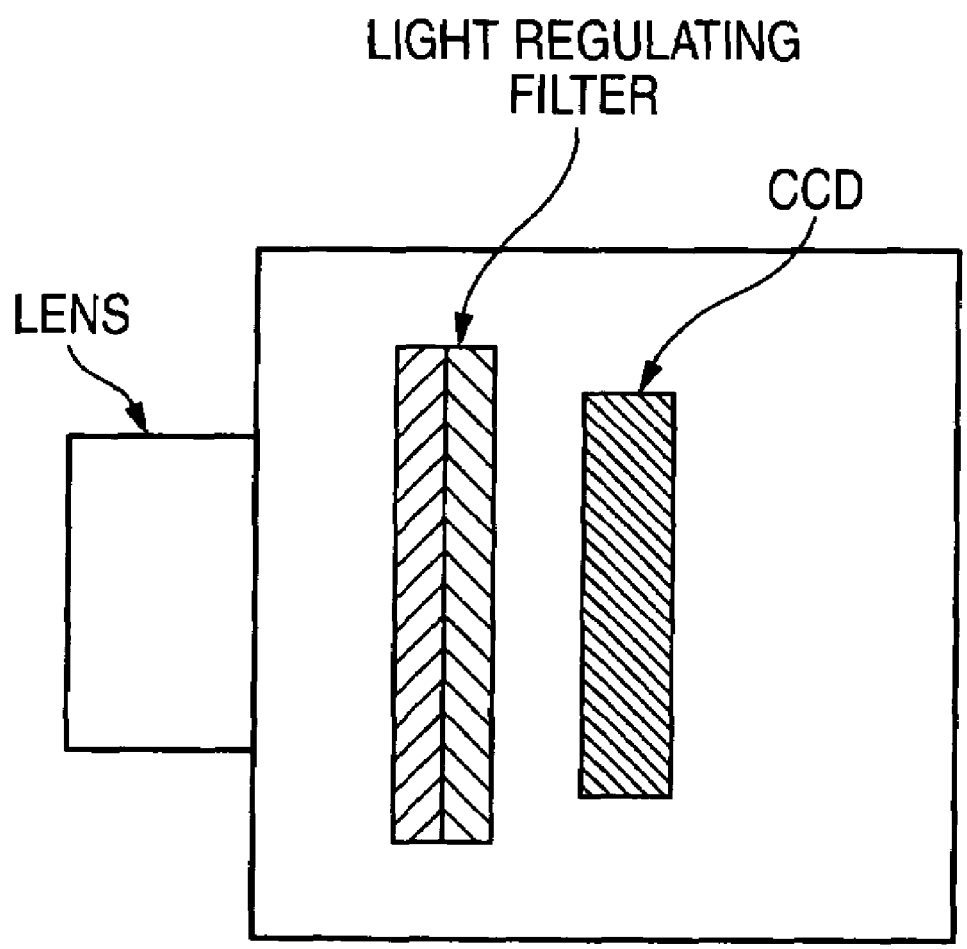
FIG. 8 is a schematic cross-sectional view of a principal portion of an electronic still camera having an optical element of the present invention.
Figure 9:
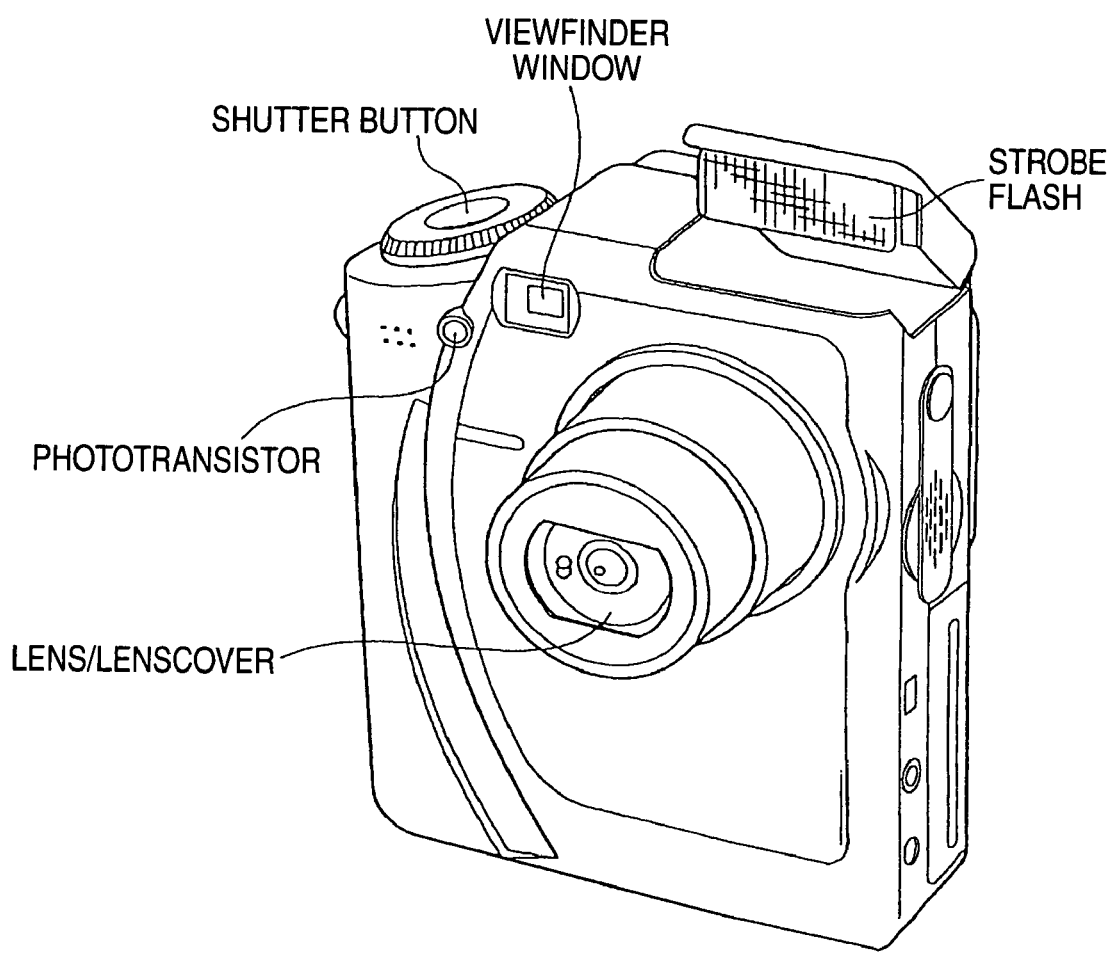
FIG. 9 is a schematic external view of an example of an electronic still camera having an optical element of the present invention.

The present example provides an electronic still camera equipped with a light regulating filter. An electronic still camera of the present example is provided, as shown in FIG. 8, with an electrochromic element prepared in Example 1-1 as a light regulating filter between a lens and a CCD, and a phototransistor same as in Example 1-4 was mounted in an external part as shown in FIG. 9 and was so connected as to control the light regulating filter, utilizing a battery incorporated in the electronic still camera as a power source. In a comparative experiment similar to that on the film with lens in Example 1-4, the invention showed a light regulating effect more conspicuous in the electronic still camera having a narrower dynamic range than in the film unit with lens.

Example 1-6

The present example provides a photographing unit for a cellular phone, equipped with a light regulating filter. An electrochromic element prepared in the same manner as in Example 1-1 was mounted, as a light regulating filter, on a lens of a photographing unit of a cellular phone, and a phototransistor same as in Example 1-4 was mounted around the photographing unit and was so connected as to control the light regulating filter, utilizing a battery incorporated in the cellular phone as a power source. The cellular phone equipped with the photographing unit of the present example was capable of photographing in wider exposure conditions in comparison with a photographing unit not equipped with the optical element of the invention.

Example 1-7

The present example provides a film with lens described in JP-A No. 2003-344914, mounted with the electrochromic element of the present invention. In a comparative experiment similar to Example 1-4, the electrochromic element of the invention exhibited an excellent light regulating also in this example.

Example 1-8

The present example provides an electronic still camera equipped with a light regulating filter. An electronic still camera of the present example is provided, as shown in FIG. 8, with an electrochromic element 1-104 prepared in Example 1-3 as a light regulating filter between a lens and a CCD, and a phototransistor same as in Example 1-4 was mounted in an external part as shown in FIG. 9 and was so connected as to control the light regulating filter; utilizing a battery incorporated in the electronic still camera as a power source. In a comparative experiment similar to that on the film with lens in Example 1-4, the invention showed a light regulating effect more conspicuous in the electronic still camera having a narrower dynamic range than in the film unit with lens.

Example 1-9

The present example provides an electronic still camera described in JP-A No. 2004-222160, mounted with the electrochromic element of the present invention. In a comparative experiment similar to Example 1-8, the electrochromic element of the invention exhibited an excellent light regulating also in this example.

Example 1-10

The present example provides an electronic still camera described in JP-A No. 2004-236006, mounted with the electrochromic element of the present invention. In a comparative experiment similar to Example 1-8, the electrochromic element of the invention exhibited an excellent light regulating also in this example.

Example 1-11

The present example provides an electronic still camera described in JP-A No. 2004-247842, mounted with the electrochromic element of the present invention. In a comparative experiment similar to Example 1-8, the electrochromic element of the invention exhibited an excellent light regulating also in this example.

Example 1-12

The present example provides an electronic still camera described in JP-A No. 2004-245915, mounted with the electrochromic element of the present invention. In a comparative experiment similar to Example 1-8, the electrochromic element of the invention exhibited an excellent light regulating also in this example.

Example 1-13

The present example provides a photographing unit for a cellular phone, equipped with a light regulating filter. An electrochromic element 1-104 prepared in the same manner as in Example 1-3 was mounted, as a light regulating filter, on a lens of a photographing unit of a cellular phone, and a phototransistor same as in Example 1-4 was mounted around the photographing unit and was so connected as to control the light regulating filter, utilizing a battery incorporated in the cellular phone as a power source. The cellular phone equipped with the photographing unit of the present example was capable of photographing in wider exposure conditions in comparison with a photographing unit not equipped with the optical element of the invention.

Example 1-14

The present example provides a cellular phone with a camera, having a photographic lens described in JP-A No. 2004-271991, mounted with the electrochromic element of the present invention. In a comparative experiment similar to Example 1-8, the electrochromic element of the invention exhibited an excellent light regulating also in this example.

In the following, the second invention will be clarified further by examples, but the present invention is naturally not limited to such examples.

Example 2-1

An example of the optical density changing element of the present invention will be shown.

An electrochromic filter constituting an optical density changing element was prepared by a procedure of (i) coating of tin oxide nanoparticles for cathode, (ii) coating of tin oxide nanoparticles for anode, (iii) adsorption of chromic dye for cathode, (iv) adsorption of chromic dye for anode, and (v) preparation of filter element.

(i) Coating of Tin Oxide Nanoparticles for Cathode

In an aqueous dispersion of tin oxide of a diameter of about 10 nm, polyvinyl alcohol was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transparent conductive glass, the coating liquid was coated uniformly so as to obtain an amount of tin oxide of 6 g/m². After the coating, the coated glass substrate was calcined for 30 minutes at 450° C. to eliminate the polymer, thereby obtaining a tin oxide nanoporous electrode. The electrode prepared in the aforementioned process had a surface roughness factor of about 750.

(ii) Coating of Tin Oxide Nanoparticles for Anode

In an aqueous dispersion of tin oxide of a diameter of about 5 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transparent conductive glass, the coating liquid was coated uniformly, then heated to 450° C. over 100 minutes and calcined for 30 minutes at 450° C. to eliminate the polymer. The coating and the calcining were repeated until tin oxide reached a total coating amount of 7 g/m², thereby obtaining a tin oxide nanoporous electrode. The electrode prepared in the aforementioned process had a surface roughness factor of about 750.

(iii) Adsorption of Chromic Dye Cathode

Following chromic dye (V'-3) was employed. The chromic dye V'-3 has a property of developing color by being reduced at the cathode (− pole).

V'-3 was dissolved in water with a concentration of 0.02 ml/l, and the tin oxide porous electrode prepared in (i) was immersed in the V-3 solution, and adsorption was conducted for 3 hours at 40° C. After the chemical adsorption, the electrode was rinsed with water, and was dried under vacuum.

The adsorption of the chromic dye to the nanoparticles can also be executed, instead of the aforementioned immersion method, for example by a method of mixing the dye in the coating liquid when the nanoparticles are coated on the transparent conductive glass in the step (i).

(iv) Adsorption of Chromic Dye for Anode

The aforementioned phenothiazine dye (P-1) was employed as the chromic dye for anode. The chromic dye P-1 has a property of developing color by being oxidized at the anode (+ pole).

P-1 was dissolved in a chloroform/methanol mixed solvent with a concentration of 0.02 mol/l, and the tin oxide porous electrode prepared in (ii) was immersed to execute the adsorption for 3 hours at 40° C. After the chemical adsorption, the electrode was rinsed with water, and was dried under vacuum.

(v) Preparation of Filter Element

Figure 10:
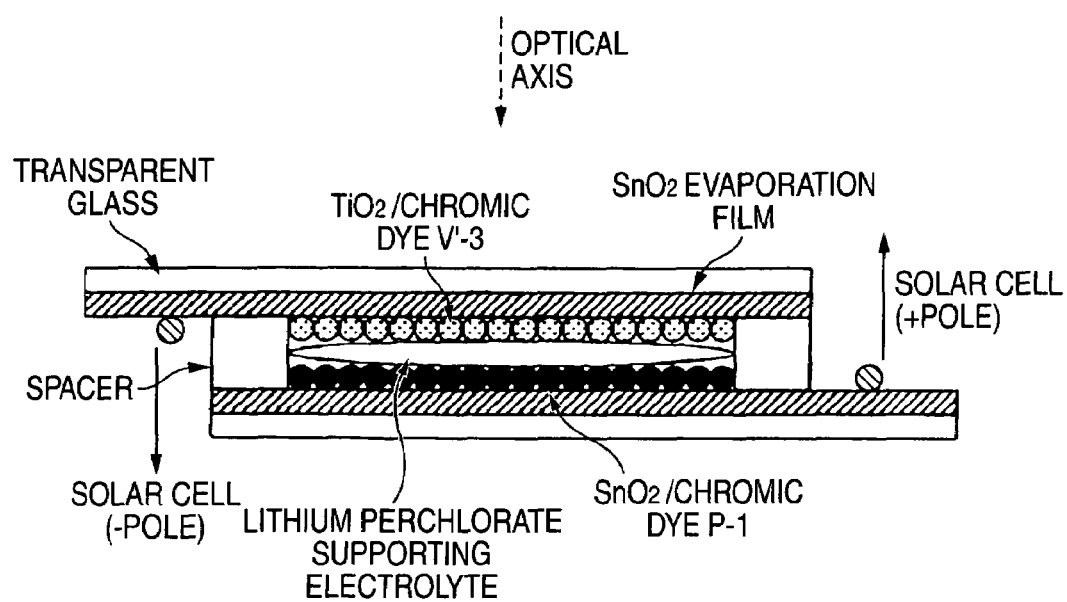
FIG. 10 is a schematic cross-sectional view showing a configuration of an example (light regulating filter) of an optical density changing element of the present invention.

The tin oxide porous nanoporous electrode adsorbing the dye V'-3 and the tin oxide porous nanoporous electrode adsorbing the dye P-1 were opposed as shown in FIG. 10, and, in a gap therebetween, a 0.2 mol/l γ-butyrolactone solution of lithium perchlorate was sealed as an electrolyte to obtain an element. An electrochromic filter was obtained through the aforementioned process.

The filter promptly developed a color when a voltage is applied thereto in such a manner that the tin oxide porous nanoporous electrode adsorbing the dye V'-3 becomes a cathode (− pole) and the tin oxide porous nanoporous electrode adsorbing the dye P-1 becomes an anode (+ pole), and the color was promptly erased by terminating the voltage application and shortcircuiting the poles.

Example 2-2

There will be shown an example with a change in the materials of the semiconductor nanoparticles employed.

An electrochromic filter was prepared by a procedure of (i) coating of tin oxide nanoparticles for cathode, (ii) coating of tin oxide nanoparticles for anode, (iii) adsorption of chromic dye, and (iv) preparation of filter element.

(i) Coating of Tin Oxide Nanoparticles for Cathode

In an aqueous dispersion of tin oxide of a diameter of about 40 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transparent conductive glass, the coating liquid was coated uniformly so as to obtain an amount of tin oxide of 9 g/m². After the coating, the coated glass substrate was calcined for 30 minutes at 450° C. to eliminate the polymer, thereby obtaining a tin oxide nanoporous electrode. The electrode prepared in the aforementioned process had a surface roughness factor of about 750.

(ii) Coating of Tin Oxide Nanoparticles for Anode was Conducted in the Same Manner as in Example 2-1

(iii) Adsorption of Chromic Dye for Cathode

Chromic dyes V'-3 and V'-4 were employed. The chromic dyes V'-3 and V'-4 have a property of developing color by being reduced at the cathode (− pole).

V'-3 and V'-4 in same molar amounts were dissolved in water with a concentration of 0.02 ml/l, and the tin oxide porous electrode prepared in (i) was immersed to execute chemical adsorption for 3 hours at 40° C. After the chemical adsorption, the glass was rinsed with water, and was dried under vacuum.

(iv) Adsorption of Electrochromic Dye for Anode

The aforementioned phenothiazine dye (P-1) was employed as the chromic dye for anode. The chromic dye P-1 has a property of developing color by being oxidized at the anode (+ pole). The adsorption was conducted in the same manner as in Example 2-1.

(v) Preparation of Filter Element

The tin oxide porous nanoporous electrode adsorbing the dyes V'-3 and V'-4, and the tin oxide porous nanoporous electrode adsorbing the dye P-1 were opposed, and, in a gap therebetween, a 0.2 mol/l γ-butyrolactone solution of lithium perchlorate was sealed as an electrolyte to obtain an element. An electrochromic filter was obtained through the aforementioned process.

A color development was obtained in a wider wavelength range.

Example 2-3

An electrochromic filter was prepared in the identical manner as in Example 2-2, except that the electrochromic dye for cathode in Example 2-2 was replaced by V'-1, V'-5 and V'-7.

A well balanced color development was obtained over the entire visible wavelength range (400-700 nm).

Example 2-4

An electrochromic filter was prepared in the identical manner as in Example 2-2, except that the electrochromic dye for cathode in Example 2-2 was replaced by V'-2, V'-6 and V'-8.

A well balanced color development was obtained over the entire visible wavelength range (400-700 nm).

Example 2-5

There will be shown an example of mounting the electrochromic element of the invention on a film with lens.

The film unit with lens of the present example is equipped, as shown in FIGS. 2 and 3, with (1) a light regulating filter 23 (optical density changing element) and (2) a solar cell 13 (electromotive force generating element). The solar cell 13 provided outside the unit generates an electromotive force corresponding to the intensity of the external light, and the light regulating filter 23 regulates the light amount arriving at a photographic film 16 according to such electromotive force thereby preventing an overexposure under a high luminance environment. In the following, details and preparing method of the (1) light regulating filter and (2) solar cell will be explained.

(1) The light regulating filter was prepared by a procedure of (i) coating of tin oxide nanoparticles for cathode, (ii) coating of tin oxide nanoparticles for anode, (iii) adsorption of chromic dye, and (iv) preparation of filter element.

(i) Coating of Tin Oxide Nanoparticles for Cathode

In an aqueous dispersion of tin oxide of a diameter of about 40 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate.

On the $SnO_2$ film of the transparent conductive glass, the coating liquid was coated uniformly so as to obtain an amount of tin oxide of 9 $g/m^2$. After the coating, the coated glass substrate was calcined for 30 minutes at 450° C. to eliminate the polymer, thereby obtaining a tin oxide nanoporous electrode. The electrode prepared in the aforementioned process had a surface roughness factor of about 750.

(ii) Coating of Tin Oxide Nanoparticles for Anode

In an aqueous dispersion of tin oxide of a diameter of about 5 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transpatent conductive glass, the coating liquid was coated uniformly, then heated to 450° C. over 100 minutes and calcined for 30 minutes at 450° C. to eliminate the polymer. The coating and the calcining were repeated until tin oxide reached a total coating amount of 7 $g/m^2$, thereby obtaining a tin oxide nanoporous electrode. The electrode prepared in the aforementioned process had a surface roughness factor of about 750.

(iii) Adsorption of Chromic Dye for Cathode

Chromic dyes V'-1, V'-5 and V'-7 were employed. The chromic dyes V'-1, V'-5 and V'-7 have a property of developing color by being reduced at the cathode (– pole).

V'-1, V'-5 and V'-7 in same molar amounts were dissolved in water with a concentration of 0.02 ml/l, and the tin oxide porous electrode prepared in (i) was immersed to execute chemical adsorption for 3 hours at 40° C. After the chemical adsorption, the glass was rinsed with water, and was dried under vacuum.

(iv) Adsorption of Electrochromic Dye for Anode

The aforementioned phenothiazine dye (P-1) was employed as the chromic dye for anode. The chromic dye P-1 has a property of developing color by being oxidized at the anode (+ pole). The adsorption was conducted in the same manner as in Example 2-1.

(v) preparation of Filter Element

The tin oxide porous nanoporous electrode adsorbing the dyes V'-1, V'-5 and V'-7, and the tin oxide porous nanoporous electrode adsorbing the dye P-1 were opposed, and, in a gap therebetween, a 0.2 mol/l γ-butyrolactone solution of lithium perchlorate was sealed as an electrolyte to obtain a light regulating filter. At the connection with the solar cell, the tin oxide porous nanoporous electrode adsorbing the dyes V'-1, V'-5 and V'-7 to a (–) pole of the solar cell and the tin oxide porous nanoporous electrode adsorbing the dye P-1 to a (+) pole of the solar cell.

(2) Solar Cell

As the solar cell, there was employed a silicon cell SS-3012DS (manufactured by Sinonar Co.), and unit cells of such solar cell were serially connected to obtain an electromotive force of about 1.5 V. Electromotive characteristics of the used solar cell to a pseudo solar light (a xenon lamp and an AM1.5 spectral filter manufactured by Oriel Co.) are shown in FIG. 5 as a function of light amount.

The (1) light regulating filter and the (2) solar cell mentioned above were used to prepare a film unit with lens. There was obtained a light regulating filter showing a color development over a wire wavelength range.

The (1) light regulating filter and the (2) solar cell mentioned above were used to prepare a film unit with lens of a configuration shown in Table 2-1. It had a film sensitivity of ISO 1600, a diaphragm of F8 and a shutter speed of ⅟85 sec. The photographing system constituted as explained above provides a negative image of an optimum density in a photographing operation under a condition of EV=8.4.

TABLE 2-1

| sample No. | solar cell | light regulating filter |
| --- | --- | --- |
| 2-101 (comp. ex.) | absent | filter absent |
| 2-102 (invention) | present | filter present |

Figure 11:
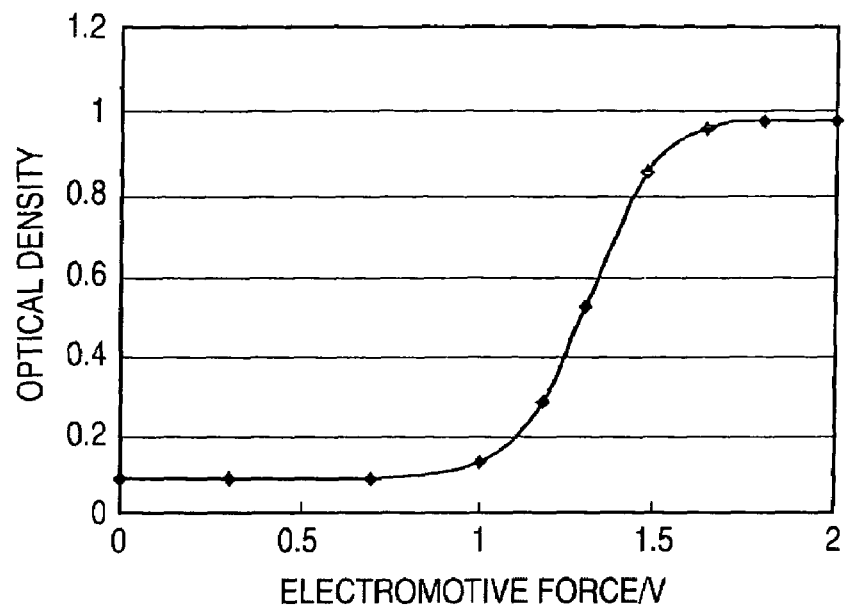
FIG. 11 is a graph showing electromotive response characteristics of a light regulating filter prepared in Example 2-1.
Figure 12:
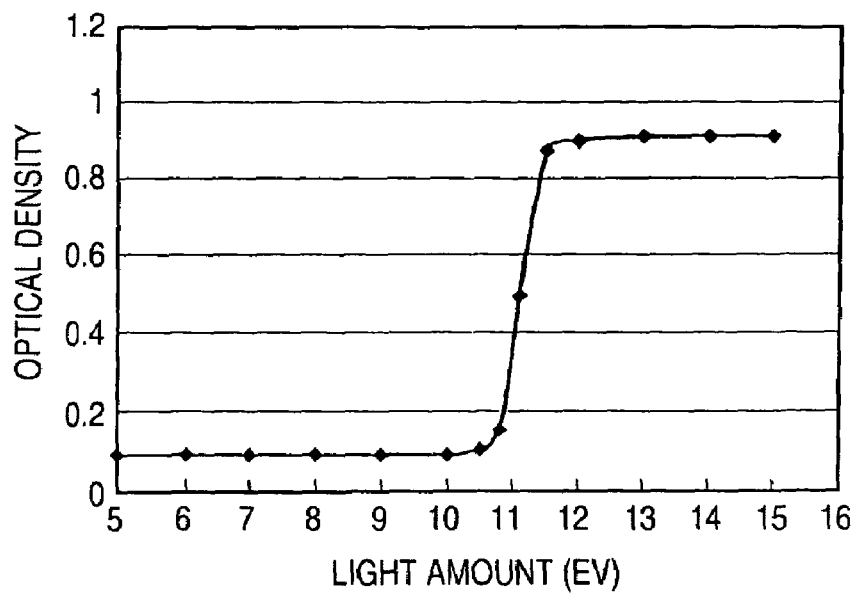
FIG. 12 is a graph showing electromotive response characteristics of an optical element of the present invention prepared in Example 2-1.

Optical density characteristics of the optical element employed in the sample 2-102 are shown in FIG. 11, as a function of the electromotive force of the solar cell. Also optical density response characteristics based on these results of the optical element, constituted of the solar cell and the light regulating filter are shown in FIG. 12, as a function of the light amount. The indicated optical density is an average over λ=400-700 nm. An increase by +1 of an aperture stop number corresponds to a reduction of the transmitted light amount to ½, or to an increase in the optical density by 0.3. As shown in FIG. 12, the aperture stop number of the optical element, being +0.3 when the light is intercepted, increased to +2.9 under an irradiation of the light of EV=11.5 and to +3.0 under an irradiation of the light of EV=12.0 or higher. Such change had a response time of 5 seconds. EV is a value indicating a brightness, and is calculated from a following equation (2) from a brightness L represented by a practical unit "lux" for an illumination intensity:

$$EV=\log_2(L/2.4) \qquad (2)$$

In relation to the aperture stop number mentioned above, an increase by +1 in the aperture stop number corresponds to a decrease by 1 of the EV value of the light received through the optical element.

The aforementioned units 2-101, 2-102 were subjected to photographing operations under brightness conditions of EV=6.4 (corresponding to a dark indoor environment) to 15.4 (corresponding a bright summer outdoor condition), and developed in a CN-16 developing process of Fuji Photo Film Co. for 3 minutes and 15 seconds. Exposure levels obtained on the negative film are shown in Table 2-2. An exposure level indicates an appropriateness of the negative density after the processing, with an optimum negative density represented by 0. In the photographing system employed in the present example, there is obtained an optimum negative density, or an exposure level=0 in a photographing operation under a condition EV=8.4. An exposure level +1 means a density higher than an optimum gray density by 1 stop (corresponding to an optical density higher by 0.3), and an exposure level –1 means a density lower than an optimum gray density by 1 stop (corresponding to an optical density lower by 0.3).

TABLE 2-2

| photographing condition sample | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
|---|---|---|---|---|---|---|---|---|---|---|
| 2-101(comp. ex.) | −2.0 | −1.0 | 0 | +1.0 | +2.0 | +3.0 | +4.0 | +5.0 | +6.0 | +7.0 |
| 2-102(invention) | −2.3 | −1.3 | −0.3 | +0.7 | +1.7 | +0.4 | +1.0 | +2.0 | +3.0 | +4.0 |

In the case of obtaining a print from thus obtained negative image, a certain aberration in the exposure level is correctable. More specifically, a correction at the printing operation is possible for negative films of exposure levels within a range from −1 to +4, and a "successfully taken photograph" can be obtained. In the case the exposure level is not within the aforementioned range, a sufficient correction cannot be realized at the printing operation, thus resulting in a "failed photograph". Table 2-3 shows whether a photograph printed from the negative photographed under the aforementioned condition is successful or not, wherein (+) indicates a success and (−) indicates a failure.

TABLE 2-3

| photographing condition sample | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
|---|---|---|---|---|---|---|---|---|---|---|
| 101(comp. ex.) | − | + | + | + | + | + | + | − | − | − |
| 102(invention) | − | − | + | + | + | + | + | + | + | + |

Table 2-3 indicates following results. The sample 2-102 having the light regulating system of the invention, in comparison with the comparative example 2-101 not having the light regulating system, showed a somewhat narrower photographable range under conditions of lower illumination intensity (conditions of smaller EV) but a much wider photographable range under conditions of higher illumination intensity (conditions of larger EV), thus realizing a camera system of a wider photographable range in total.

Example 2-6

The present example provides an electronic still camera equipped with a light regulating filter. An electronic still camera of the present example is provided, as shown in FIG. 8, with an electrochromic element prepared in Example 2-3 as a light regulating filter between a lens and a CCD, and a phototransistor smaller than the solar cell in Example 2-5 was mounted in an external part as shown in FIG. 9 and was so connected as to control the light regulating filter, utilizing a battery incorporated in the electronic still camera as a power source. In a comparative experiment similar to that on the film with lens in Example 2-5, the invention showed a light regulating effect more conspicuous in the electronic still camera having a narrower dynamic range than in the film unit with lens.

Example 2-7

The present example provides a photographing unit for a cellular phone, equipped with a light regulating filter. An electrochromic element prepared in the same manner as in Example 2-3 was mounted, as a light regulating filter, on a lens of a photographing unit of a cellular phone, and a phototransistor same as in Example 2-6 was mounted around the photographing unit and was so connected as to control the light regulating filter, utilizing a battery incorporated in the cellular phone as a power source. The cellular phone equipped with the photographing unit of the present example was capable of photographing in wider exposure conditions in comparison with a photographing unit not equipped with the optical element of the invention.

The first invention allows to provide an electrochromic element (optical density changing element) adapted for use as a light regulating filter. For example, in case of mounting a light regulating filter on a film with lens and regulating the light amount entering the film with lens, there can be provided an electrochromic element having a color hue close to the spectral sensitivity of a photographic film (particularly preferably a color negative film) loaded in the film with lens. The electrochromic element of the invention is applicable not only to a photographing equipment such as a film with lens, but also to any uses requiring a light regulating function or a light decreasing function.

The second present invention allows to obtain an electrochromic element and an optical density changing element having a fast response to light of various wavelengths. There are also obtained an optical element constituted of the optical density changing element and an electromotive force generating element, and a photographing unit provided with such optical element.

The entire disclosure of each and every foreign patent application from which the benefit of foreign priority has been claimed in the present application is incorporated herein by reference, as if fully set forth.

The invention claimed is:

1. An electrochromic element comprising:
a semiconductor material which is a nanoporous semiconductor material having a roughness factor of 20 or higher; and
an electrochromic material on a surface of the semiconductor material, the electrochromic material comprising at least one of electrochromic materials represented by formulas (1), (2) and (3):

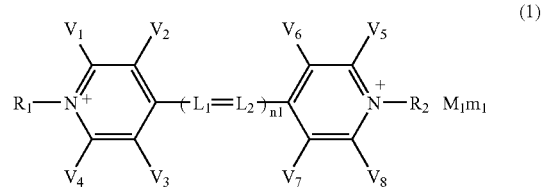

-continued

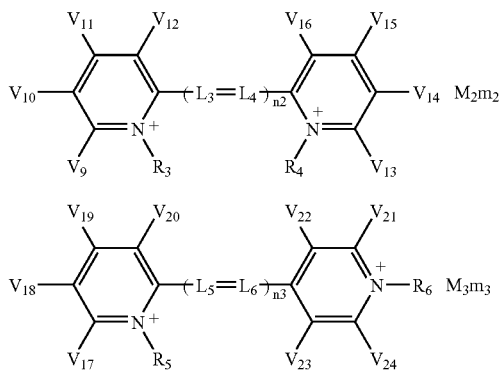

(2)

(3)

wherein $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent;

$R_1$, $R_2$, $R_3$, $R_4$, $R_5$ and $R_6$ each independently represents a hydrogen atom, an alkyl group, an aryl group or a heterocyclic group;

$L_1$, $L_2$, $L_3$, $L_4$, $L_5$ and $L_6$ each independently represents a methine group or a nitrogen atom;

$n_1$, $n_2$ and $n_3$ each independently represents 0, 1, 2 or 3;

$M_1$, $M_2$ and $M_3$ each independently represents a charge balancing counter ion, and $m_1$, $m_2$ and $m_3$ each independently represents a number equal to or larger than 0 necessary for neutralizing a charge of a molecule; and in the case $n_1$, $n_2$ and $n_3$ are 0, $R_1$, $R_2$, $R_3$, $R_4$, $R_5$ and $R_6$ each independently represents an aryl group, and compounds represented by the formulas (1) to (3) each independently has at least a group selected from a sulfo group, a phosphono group and a phosphato group.

2. An electrochromic element according to claim 1, wherein, in the formulas (1) to (3), $n_1$, $n_2$ and $n_3$ each independently represents 1; $L_1$, $L_2$, $L_3$, $L_4$, $L_5$ and $L_6$ each independently represents a methine group; and compounds represented by the general formulas (1) to (3) each independently has at least two phosphono groups or two phosphate groups.

3. An electrochromic element according to claim 1, wherein, in the formula (1), $n_1$ is 0; the compound represented by the formula (1) has at least two phosphono groups or two phosphato groups.

4. An electrochromic element according to claim 1, which has, in a decolored state of the electrochromic element, an optical density equal to or less than 0.125 at any wavelength within a wavelength range of 400 to 700 nm.

5. An optical density changing element comprising at least one electrochromic element according to claim 1.

6. An optical density changing element according to claim 5, which has, in a decolored state of the optical density changing element, an optical density of 0.2 or less at a wavelength of 400 nm.

7. An optical density changing element according to claim 5, wherein, in a decolored state of the optical density changing element, each of a fourth average optical density in a fourth wavelength range of 400 to 500 nm, a fifth average optical density in a fifth wavelength range of 500 to 600 nm and a sixth average optical density in a sixth wavelength range of 600 to 700 nm is 0.1 or less.

8. An optical element comprising:
an electromotive force generating element capable of generating an electromotive force in response to an electromagnetic wave; and
an optical density changing element according to claim 5, capable of changing an optical density of the optical density changing element by the electromotive force.

9. A photographing unit comprising an optical element according to claim 8.

10. A photographing unit according to claim 9, wherein the photographic unit is a film with lens.

* * * * *